US012672055B2

(12) United States Patent
He et al.

(10) Patent No.: US 12,672,055 B2
(45) Date of Patent: Jun. 30, 2026

(54) APPARATUS, METHODS, AND COMPUTER PROGRAMS

(71) Applicant: Nokia Solutions and Networks Oy, Espoo (FI)

(72) Inventors: Mu He, Munich (DE); Bruno Landais, Lannion (FR); Christian Mannweiler, Munich (DE); Xin Wang, Qingdao (CN); Xinxin Wang, Qingdao (CN); Hanxiao Du, Qingdao (CN)

(73) Assignee: Nokia Solutions and Networks Oy, Espoo (FI)

( * ) Notice: Subject to any disclaimer, the term of this patent is extended or adjusted under 35 U.S.C. 154(b) by 293 days.

(21) Appl. No.: 18/570,833

(22) PCT Filed: Jun. 18, 2021

(86) PCT No.: PCT/CN2021/101048
§ 371 (c)(1),
(2) Date: Dec. 15, 2023

(87) PCT Pub. No.: WO2022/261972
PCT Pub. Date: Dec. 22, 2022

(65) Prior Publication Data
US 2024/0323824 A1     Sep. 26, 2024

(51) Int. Cl.
*H04W 48/18*     (2009.01)
*H04W 48/16*     (2009.01)
*H04W 84/04*     (2009.01)
(52) U.S. Cl.
CPC ........... *H04W 48/18* (2013.01); *H04W 48/16* (2013.01); *H04W 84/042* (2013.01)

(58) Field of Classification Search
CPC ... H04W 48/18; H04W 48/16; H04W 84/042; H04W 8/00; H04W 36/12; H04W 4/20
See application file for complete search history.

(56) References Cited

FOREIGN PATENT DOCUMENTS

| WO | 2020/254925 A1 | 12/2020 | |
|----|----------------|---------|---|
| WO | 2021/027177 A1 | 2/2021 | |
| WO | WO-2021069057 A1 * | 4/2021 | ............ H04W 48/18 |
| WO | 2021/099676 A1 | 5/2021 | |

OTHER PUBLICATIONS

"3rd Generation Partnership Project, Technical Specification Group Core Network and Terminals; 5G System; Technical Realization of Service Based Architecture; Stage 3 (Release 17)", 3GPP TS 29.500, V17.2.0 , Mar. 2021, pp. 1-100.

(Continued)

*Primary Examiner* — Marisol Figueroa
(74) *Attorney, Agent, or Firm* — Nokia Solutions and Networks Oy

(57)     ABSTRACT

There is provided a method for, an apparatus for, and a computer program for a second network repository function for causing an apparatus of the second network repository function to when operating in a second domain: signal an indication to a first network repository function operating in a first domain, the indication indicating whether at least one network entity in the second domain is capable of performing discovery and/or selection of a network function instance in the second domain on behalf of a network entity located in the first domain.

20 Claims, 13 Drawing Sheets

(56)     References Cited

OTHER PUBLICATIONS

"3rd Generation Partnership Project, Technical Specification Group Services and System Aspects; System architecture for the 5G System (5GS); Stage 2 (Release 17)", 3GPP TS 23.501, V17.0.0, Mar. 2021, pp. 1-489.

"SCP capabilities", 3GPP TSG-CT WG4 Meeting #104-e, C4-213084, Nokia, May 19-28, 2021, 8 pages.

"3rd Generation Partnership Project; Technical Specification Group Core Network and Terminals; 5G System; Network Function Repository Services; Stage 3 (Release 17)", 3GPP TS 29.510, V17.1.0, Mar. 2021, pp. 1-243.

"3rd Generation Partnership Project; Technical Specification Group Core Network and Terminals; Numbering, addressing and identification; (Release 17)", 3GPP TS 23.003, V17.1.0, Mar. 2021, pp. 1-143.

"3rd Generation Partnership Project; Technical Specification Group Services and System Aspects; Security architecture and procedures for 5G system (Release 17)"; 3GPP TS 33.501, V17.1.0, Mar. 2021, pp. 1-256.

International Search Report and Written Opinion received for corresponding Patent Cooperation Treaty Application No. PCT/CN2021/101048, dated Mar. 9, 2022, 10 pages.

"3rd Generation Partnership Project; Technical Specification Group Services and System Aspects; Procedures for the 5G System (5GS); Stage 2 (Release 16)", 3GPP TS 23.502, V16.8.0, Mar. 2021, pp. 1-608.

* cited by examiner

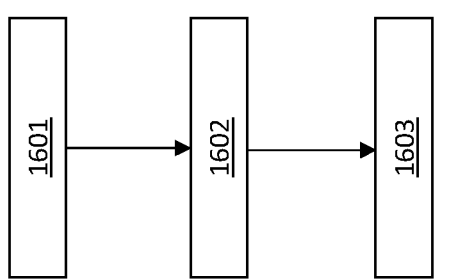
Fig. 16
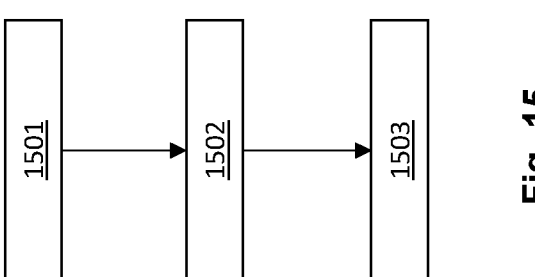
Fig. 15
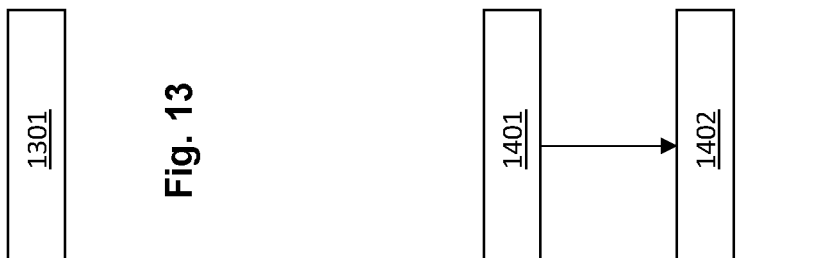
Fig. 13
Fig. 14

APPARATUS, METHODS, AND COMPUTER PROGRAMS

RELATED APPLICATION

This application is a national stage application, filed under 35 U.S.C. § 371 and was originally filed as PCT Application No. PCT/CN2021/101048, filed on Jun. 18, 2021, which is incorporated herein by reference in its entirety.

FIELD

The present disclosure relates to apparatus, methods, and computer programs, and in particular but not exclusively to apparatus, methods and computer programs for network apparatuses.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G system that allows user equipment (UE) or user device to contact a 5G core via e.g. new radio (NR) access technology or via other access technology such as Untrusted access to 5GC or wireline access technology.

SUMMARY

According to a first aspect, there is provided an apparatus for a second network repository function, the apparatus comprising: at least one processor; and at least one memory comprising code that, when executed by the at least one processor, causes the apparatus to: when operating in a second domain: signal an indication to a first network repository function operating in a first domain, the indication indicating whether at least one network entity in the second domain is capable of performing discovery and/or selection of a network function instance in the second domain on behalf of a network entity located in the first domain.

The apparatus may be caused to receive signalling from the first network repository function, the signalling comprising a first request requesting said indication, and wherein the first request is performed as part of a bootstrapping procedure.

The apparatus may be caused to receive signalling from the first network repository function, the signalling comprising a first request requesting said indication, and wherein the first request is comprised within a discovery request.

The apparatus may be caused to receive, from the first network repository function, an indication that a network function instance in the first domain is to be discovered and/or selected as a consumer of a service provided by a network function instance in the second domain, and, in response to said receiving, transmit, to a second network entity located in the second domain, an instruction to delegate discovery and/or selection of said network function instance to the network entity located in the first domain.

The discovery request may be: a request to discover a network function instance providing a requested service, and/or a request to discover a service communication proxy in the second domain that is capable of performing said discovery and/or selection.

The first indication may indicate at least one network entity in the second domain that is capable of performing discovery and/or selection of the network function instance.

The first indication may indicate at least one type of network function in the second domain that is capable of being discovered and/or selected as the network function instance by a network entity in the second domain.

The first indication may comprise at least one identifier and/or address of the network entity in the second domain that is capable of performing discovery and/or selection of the network function instance.

The first indication may not comprise profiles of any network function instances.

The apparatus may be caused to maintain a store of said indication.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to a second aspect, there is provided an apparatus comprising: at least one processor; and at least one memory comprising code that, when executed by the at least one processor, causes the apparatus to: when operating in a first domain: receive a first indication from a second network repository function operating in a second domain, the first indication indicating whether at least one network entity in the second domain is capable of performing discovery and/or selection of a network function instance in the second domain on behalf of a network entity located in the first domain; and in response to said receiving, transmit, to a first network entity located in the first domain, an instruction to delegate discovery and/or selection of said network function instance to a network entity located in the second domain.

The apparatus may be caused to signal to the second network repository function a first request requesting the first indication, wherein the first request is comprised within a bootstrapping request.

The apparatus may be caused to signal to the second network repository function a first request requesting the first indication, wherein the first request is comprised within a discovery request.

The apparatus may be caused to receive, from a network entity located in the first domain, a second request to discover the network function instance in the second domain; and signal the second network repository function a first request for said first indication in response to receiving said second request.

The discovery request may be: a request to discover a network function instance providing a requested service, and/or a request to discover a service communication proxy in the second domain that is capable of performing said discovery and/or selection.

The first indication may indicate at least one network entity in the second domain that is capable of performing discovery and/or selection of the network function instance.

The first indication may indicate at least one type of network function in the second domain that is capable of being discovered and/or selected as the network function instance by a network entity in the second domain.

The first indication may comprise at least one identifier and/or address of the network entity in the second domain that is capable of performing discovery and/or selection of the network function instance.

The first indication may not comprise profiles of any network function instances.

The apparatus may be caused to maintain a store of said indication.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to a third aspect, there is provided an apparatus for a first network entity, the apparatus comprising: at least one processor; and at least one memory comprising code that, when executed by the at least one processor, causes the apparatus to: when operating in a first domain comprising a first network function instance: receive signalling for a second network function instance located in a second domain, the signalling not identifying the second network function instance; obtain an indication of a second network entity operating in a second domain that is capable of performing discovery and/or selection of a network function instance in the second domain; and signal a request to the second network entity, the request requesting that the second network entity performs discovery and/or selection of the second network function instance.

The apparatus may be caused to obtain said indication of the second network entity by performing a discovery procedure with a first network repository function that is located in the first domain.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to a fourth aspect, there is provided an apparatus for a second network entity, the apparatus comprising: at least one processor; and at least one memory comprising code that, when executed by the at least one processor, causes the apparatus to: when operating in a second domain comprising at least one network function instance; receive, from a first network entity in a first domain, a request requesting that the second network entity performs discovery and/or selection of a network function instance; initiate discovery and/or selection of a network function instance of said at least one network instance comprised in the second domain; and send the received request to the selected network function instance.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to a fifth aspect, there is provided an apparatus for a second network repository function, the apparatus comprising: when operating in a second domain: means for signalling an indication to a first network repository function operating in a first domain, the indication indicating whether at least one network entity in the second domain is capable of performing discovery and/or selection of a network function instance in the second domain on behalf of a network entity located in the first domain.

The apparatus may comprise means for receiving signalling from the first network repository function, the signalling comprising a first request requesting said indication, and wherein the first request is performed as part of a bootstrapping procedure.

The apparatus may comprise means for receiving signalling from the first network repository function, the signalling comprising a first request requesting said indication, and wherein the first request is comprised within a discovery request.

The apparatus may comprise means for receiving, from the first network repository function, an indication that a network function instance in the first domain is to be discovered and/or selected as a consumer of a service provided by a network function instance in the second domain, and, in response to said receiving, transmit, to a second network entity located in the second domain, an instruction to delegate discovery and/or selection of said network function instance to the network entity located in the first domain.

The discovery request may be: a request to discover a network function instance providing a requested service, and/or a request to discover a service communication proxy in the second domain that is capable of performing said discovery and/or selection.

The first indication may indicate at least one network entity in the second domain that is capable of performing discovery and/or selection of the network function instance.

The first indication may indicate at least one type of network function in the second domain that is capable of being discovered and/or selected as the network function instance by a network entity in the second domain.

The first indication may comprise at least one identifier and/or address of the network entity in the second domain that is capable of performing discovery and/or selection of the network function instance.

The first indication may not comprise profiles of any network function instances.

The apparatus may comprise means for maintaining a store of said indication.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to a sixth aspect, there is provided an apparatus for a first network repository function, the apparatus comprising: when operating in a first domain: means for receiving a first indication from a second network repository function operating in a second domain, the first indication indicating whether at least one network entity in the second domain is capable of performing discovery and/or selection of a network function instance in the second domain on behalf of a network entity located in the first domain; and means for, in response to said receiving, transmitting, to a first network entity located in the first domain, an instruction to delegate discovery and/or selection of said network function instance to a network entity located in the second domain.

The apparatus may comprise means for signalling to the second network repository function a first request requesting the first indication, wherein the first request is comprised within a bootstrapping request.

The apparatus may comprise means for signalling to the second network repository function a first request requesting the first indication, wherein the first request is comprised within a discovery request.

The apparatus may comprise means for receiving, from a network entity located in the first domain, a second request to discover the network function instance in the second domain; and signal the second network repository function a first request for said first indication in response to receiving said second request.

The discovery request may be: a request to discover a network function instance providing a requested service, and/or a request to discover a service communication proxy in the second domain that is capable of performing said discovery and/or selection.

The first indication may indicate at least one network entity in the second domain that is capable of performing discovery and/or selection of the network function instance.

The first indication may indicate at least one type of network function in the second domain that is capable of being discovered and/or selected as the network function instance by a network entity in the second domain.

The first indication may comprise at least one identifier and/or address of the network entity in the second domain that is capable of performing discovery and/or selection of the network function instance.

The first indication may not comprise profiles of any network function instances.

The apparatus may comprise means for maintaining a store of said indication.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to a seventh aspect, there is provided an apparatus for a first network entity, the apparatus comprising: when operating in a first domain comprising a first network function instance: means for receiving signalling for a second network function instance located in a second domain, the signalling not identifying the second network function instance; means for obtaining an indication of a second network entity operating in a second domain that is capable of performing discovery and/or selection of a network function instance in the second domain; and means for signalling a request to the second network entity, the request requesting that the second network entity performs discovery and/or selection of the second network function instance.

The apparatus may comprise means for obtaining said indication of the second network entity by performing a discovery procedure with a first network repository function that is located in the first domain.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to an eighth aspect, there is provided an apparatus for a second network entity, the apparatus comprising: when operating in a second domain comprising at least one network function instance; means for receiving, from a first network entity in a first domain, a request requesting that the second network entity performs discovery and/or selection of a network function instance; means for initiating discovery and/or selection of a network function instance of said at least one network instance comprised in the second domain; and means for sending the received request to the selected network function instance.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to a ninth aspect, there is provided a method for an apparatus for a second network repository function, the method comprising: when operating in a second domain: signalling an indication to a first network repository function operating in a first domain, the indication indicating whether at least one network entity in the second domain is capable of performing discovery and/or selection of a network function instance in the second domain on behalf of a network entity located in the first domain.

The method may comprise receiving signalling from the first network repository function, the signalling comprising a first request requesting said indication, and wherein the first request is performed as part of a bootstrapping procedure.

The method may comprise receiving signalling from the first network repository function, the signalling comprising a first request requesting said indication, and wherein the first request is comprised within a discovery request.

The method may comprise receiving, from the first network repository function, an indication that a network function instance in the first domain is to be discovered and/or selected as a consumer of a service provided by a network function instance in the second domain, and, in response to said receiving, transmit, to a second network entity located in the second domain, an instruction to delegate discovery and/or selection of said network function instance to the network entity located in the first domain.

The discovery request may be: a request to discover a network function instance providing a requested service, and/or a request to discover a service communication proxy in the second domain that is capable of performing said discovery and/or selection.

The first indication may indicate at least one network entity in the second domain that is capable of performing discovery and/or selection of the network function instance.

The first indication may indicate at least one type of network function in the second domain that is capable of being discovered and/or selected as the network function instance by a network entity in the second domain.

The first indication may comprise at least one identifier and/or address of the network entity in the second domain that is capable of performing discovery and/or selection of the network function instance.

The first indication may not comprise profiles of any network function instances.

The method may comprise maintaining a store of said indication.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to a tenth aspect, there is provided a method for an apparatus, the method comprising: when operating in a first domain: receiving a first indication from a second network repository function operating in a second domain, the first indication indicating whether at least one network entity in the second domain is capable of performing discovery and/or selection of a network function instance in the second domain on behalf of a network entity located in the first domain; and in response to said receiving, transmitting, to a first network entity located in the first domain, an instruction to delegate discovery and/or selection of said network function instance to a network entity located in the second domain.

The method may comprise signalling to the second network repository function a first request requesting the first indication, wherein the first request is comprised within a bootstrapping request.

The method may comprise signalling to the second network repository function a first request requesting the first indication, wherein the first request is comprised within a discovery request.

The method may comprise receiving, from a network entity located in the first domain, a second request to discover the network function instance in the second domain; and signal the second network repository function a first request for said first indication in response to receiving said second request.

The discovery request may be: a request to discover a network function instance providing a requested service, and/or a request to discover a service communication proxy in the second domain that is capable of performing said discovery and/or selection.

The first indication may indicate at least one network entity in the second domain that is capable of performing discovery and/or selection of the network function instance.

The first indication may indicate at least one type of network function in the second domain that is capable of being discovered and/or selected as the network function instance by a network entity in the second domain.

The first indication may comprise at least one identifier and/or address of the network entity in the second domain that is capable of performing discovery and/or selection of the network function instance.

The first indication may not comprise profiles of any network function instances.

The method may comprise maintaining a store of said indication.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to an eleventh aspect, there is provided a method for an apparatus for a first network entity, the method comprising: when operating in a first domain comprising a first network function instance: receiving signalling for a second network function instance located in a second domain, the signalling not identifying the second network function instance; obtaining an indication of a second network entity operating in a second domain that is capable of performing discovery and/or selection of a network function instance in the second domain; and signalling a request to the second network entity, the request requesting that the second network entity performs discovery and/or selection of the second network function instance.

The method may comprise obtaining said indication of the second network entity by performing a discovery procedure with a first network repository function that is located in the first domain.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to a twelfth aspect, there is provided a method for an apparatus for a second network entity, the method comprising: when operating in a second domain comprising at least one network function instance; receiving, from a first network entity in a first domain, a request requesting that the second network entity performs discovery and/or selection of a network function instance; initiating discovery and/or selection of a network function instance of said at least one network instance comprised in the second domain; and sending the received request to the selected network function instance.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to a thirteenth aspect, there is provided an apparatus for a second network repository function, the apparatus comprising: when operating in a second domain: signalling circuitry for signalling an indication to a first network repository function operating in a first domain, the indication indicating whether at least one network entity in the second domain is capable of performing discovery and/or selection of a network function instance in the second domain on behalf of a network entity located in the first domain.

The apparatus may comprise receiving circuitry for receiving signalling from the first network repository function, the signalling comprising a first request requesting said indication, and wherein the first request is performed as part of a bootstrapping procedure.

The apparatus may comprise receiving circuitry for receiving signalling from the first network repository function, the signalling comprising a first request requesting said indication, and wherein the first request is comprised within a discovery request.

The apparatus may comprise receiving circuitry for receiving, from the first network repository function, an indication that a network function instance in the first domain is to be discovered and/or selected as a consumer of a service provided by a network function instance in the second domain, and, in response to said receiving, transmit, to a second network entity located in the second domain, an instruction to delegate discovery and/or selection of said network function instance to the network entity located in the first domain.

The discovery request may be: a request to discover a network function instance providing a requested service, and/or a request to discover a service communication proxy in the second domain that is capable of performing said discovery and/or selection.

The first indication may indicate at least one network entity in the second domain that is capable of performing discovery and/or selection of the network function instance.

The first indication may indicate at least one type of network function in the second domain that is capable of being discovered and/or selected as the network function instance by a network entity in the second domain.

The first indication may comprise at least one identifier and/or address of the network entity in the second domain that is capable of performing discovery and/or selection of the network function instance.

The first indication may not comprise profiles of any network function instances.

The apparatus may comprise maintaining circuitry for maintaining a store of said indication.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to a fourteenth aspect, there is provided an apparatus for first network repository function, the apparatus comprising: when operating in a first domain: receiving circuitry for receiving a first indication from a second network repository function operating in a second domain, the first indication indicating whether at least one network entity in the second domain is capable of performing discovery and/or selection of a network function instance in the second domain on behalf of a network entity located in the first domain; and transmitting circuitry for, in response to said receiving, transmitting, to a first network entity located in the first domain, an instruction to delegate discovery and/or selection of said network function instance to a network entity located in the second domain.

The apparatus may comprise signalling circuitry for signalling to the second network repository function a first request requesting the first indication, wherein the first request is comprised within a bootstrapping request.

The apparatus may comprise signalling circuitry for signalling to the second network repository function a first request requesting the first indication, wherein the first request is comprised within a discovery request.

The apparatus may comprise receiving circuitry for receiving, from a network entity located in the first domain, a second request to discover the network function instance in the second domain; and signal the second network repository function a first request for said first indication in response to receiving said second request.

The discovery request may be: a request to discover a network function instance providing a requested service, and/or a request to discover a service communication proxy in the second domain that is capable of performing said discovery and/or selection.

The first indication may indicate at least one network entity in the second domain that is capable of performing discovery and/or selection of the network function instance.

The first indication may indicate at least one type of network function in the second domain that is capable of being discovered and/or selected as the network function instance by a network entity in the second domain.

The first indication may comprise at least one identifier and/or address of the network entity in the second domain that is capable of performing discovery and/or selection of the network function instance.

The first indication may not comprise profiles of any network function instances.

The apparatus may comprise maintaining circuitry for maintaining a store of said indication.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to a fifteenth aspect, there is provided an apparatus for a first network entity, the apparatus comprising: when operating in a first domain comprising a first network function instance: receiving circuitry for receiving signalling for a second network function instance located in a second domain, the signalling not identifying the second network function instance; obtaining circuitry for obtaining an indication of a second network entity operating in a second domain that is capable of performing discovery and/or selection of a network function instance in the second domain; and signalling circuitry for signalling a request to the second network entity, the request requesting that the second network entity performs discovery and/or selection of the second network function instance.

The apparatus may comprise obtaining circuitry for obtaining said indication of the second network entity by performing a discovery procedure with a first network repository function that is located in the first domain.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to a sixteenth aspect, there is provided an apparatus for a second network entity, the apparatus comprising: when operating in a second domain comprising at least one network function instance; receiving circuitry for receiving, from a first network entity in a first domain, a request requesting that the second network entity performs discovery and/or selection of a network function instance; initiating circuitry for initiating discovery and/or selection of a network function instance of said at least one network instance comprised in the second domain; and sending circuitry for sending the received request to the selected network function instance.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to a seventeenth aspect, there is provided non-transitory computer readable medium comprising program instructions for causing an apparatus for a second network repository function to perform at least the following: when operating in a second domain: signal an indication to a first network repository function operating in a first domain, the indication indicating whether at least one network entity in the second domain is capable of performing discovery and/or selection of a network function instance in the second domain on behalf of a network entity located in the first domain.

The apparatus may be caused to receive signalling from the first network repository function, the signalling comprising a first request requesting said indication, and wherein the first request is performed as part of a bootstrapping procedure.

The apparatus may be caused to receive signalling from the first network repository function, the signalling comprising a first request requesting said indication, and wherein the first request is comprised within a discovery request.

The apparatus may be caused to receive, from the first network repository function, an indication that a network function instance in the first domain is to be discovered and/or selected as a consumer of a service provided by a network function instance in the second domain, and, in response to said receiving, transmit, to a second network entity located in the second domain, an instruction to delegate discovery and/or selection of said network function instance to the network entity located in the first domain.

The discovery request may be: a request to discover a network function instance providing a requested service, and/or a request to discover a service communication proxy in the second domain that is capable of performing said discovery and/or selection.

The first indication may indicate at least one network entity in the second domain that is capable of performing discovery and/or selection of the network function instance.

The first indication may indicate at least one type of network function in the second domain that is capable of being discovered and/or selected as the network function instance by a network entity in the second domain.

The first indication may comprise at least one identifier and/or address of the network entity in the second domain that is capable of performing discovery and/or selection of the network function instance.

The first indication may not comprise profiles of any network function instances.

The apparatus may be caused to maintain a store of said indication.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to an eighteenth aspect, there is provided non-transitory computer readable medium comprising program instructions for causing an apparatus for a first network repository function to perform at least the following: when operating in a first domain: receive a first indication from a second network repository function operating in a second domain, the first indication indicating whether at least one network entity in the second domain is capable of performing discovery and/or selection of a network function instance in the second domain on behalf of a network entity located in the first domain; and in response to said receiving, transmit, to a first network entity located in the first domain, an instruction to delegate discovery and/or selection of said network function instance to a network entity located in the second domain.

The apparatus may be caused to signal to the second network repository function a first request requesting the first indication, wherein the first request is comprised within a bootstrapping request.

The apparatus may be caused to signal to the second network repository function a first request requesting the first indication, wherein the first request is comprised within a discovery request.

The apparatus may be caused to receive, from a network entity located in the first domain, a second request to discover the network function instance in the second domain; and signal the second network repository function a first request for said first indication in response to receiving said second request.

The discovery request may be: a request to discover a network function instance providing a requested service, and/or a request to discover a service communication proxy in the second domain that is capable of performing said discovery and/or selection.

The first indication may indicate at least one network entity in the second domain that is capable of performing discovery and/or selection of the network function instance.

The first indication may indicate at least one type of network function in the second domain that is capable of being discovered and/or selected as the network function instance by a network entity in the second domain.

The first indication may comprise at least one identifier and/or address of the network entity in the second domain that is capable of performing discovery and/or selection of the network function instance.

The first indication may not comprise profiles of any network function instances.

The apparatus may be caused to maintain a store of said indication.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to a nineteenth aspect, there is provided non-transitory computer readable medium comprising program instructions for causing an apparatus for a first network entity to perform at least the following: when operating in a first domain comprising a first network function instance: receive signalling for a second network function instance located in a second domain, the signalling not identifying the second network function instance; obtain an indication of a second network entity operating in a second domain that is capable of performing discovery and/or selection of a network function instance in the second domain; and signal a request to the second network entity, the request requesting that the second network entity performs discovery and/or selection of the second network function instance.

The apparatus may be caused to obtain said indication of the second network entity by performing a discovery procedure with a first network repository function that is located in the first domain.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to a twentieth aspect, there is provided non-transitory computer readable medium comprising program instructions for causing an apparatus for a second network entity to perform at least the following: when operating in a second domain comprising at least one network function instance; receive, from a first network entity in a first domain, a request requesting that the second network entity performs discovery and/or selection of a network function instance; initiate discovery and/or selection of a network function instance of said at least one network instance comprised in the second domain; and send the received request to the selected network function instance.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

According to a twenty first aspect, there is provided a computer program comprising program instructions for causing a computer to perform any method as described above.

According to a twenty second aspect, there is provided a computer program product stored on a medium that may cause an apparatus to perform any method as described herein.

According to a twenty third aspect, there is provided an electronic device that may comprise apparatus as described herein.

According to a twenty fourth aspect, there is provided a chipset that may comprise an apparatus as described herein.

BRIEF DESCRIPTION OF FIGURES

Examples will now be described, by way of example only, with reference to the accompanying Figures in which:

FIGS. 6 to 12 illustrate example signalling between network elements; and FIGS. 13 to 16 are flow charts illustrating potential operations that may be performed by example apparatus described herein.

DETAILED DESCRIPTION

In the following, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems with analogous components (for example, current 6G proposals). In the following, 3GPP refers to a group of organizations that develop and release different standardized communication protocols. 3GPP is currently developing and publishing documents related to Release 16, relating to 5G technology, with Release 17 currently being scheduled for 2022.

Before explaining in detail the exemplifying embodiments, certain general principles of a 5G wireless communication system are briefly explained with reference to FIG. 1.

Figure 1:
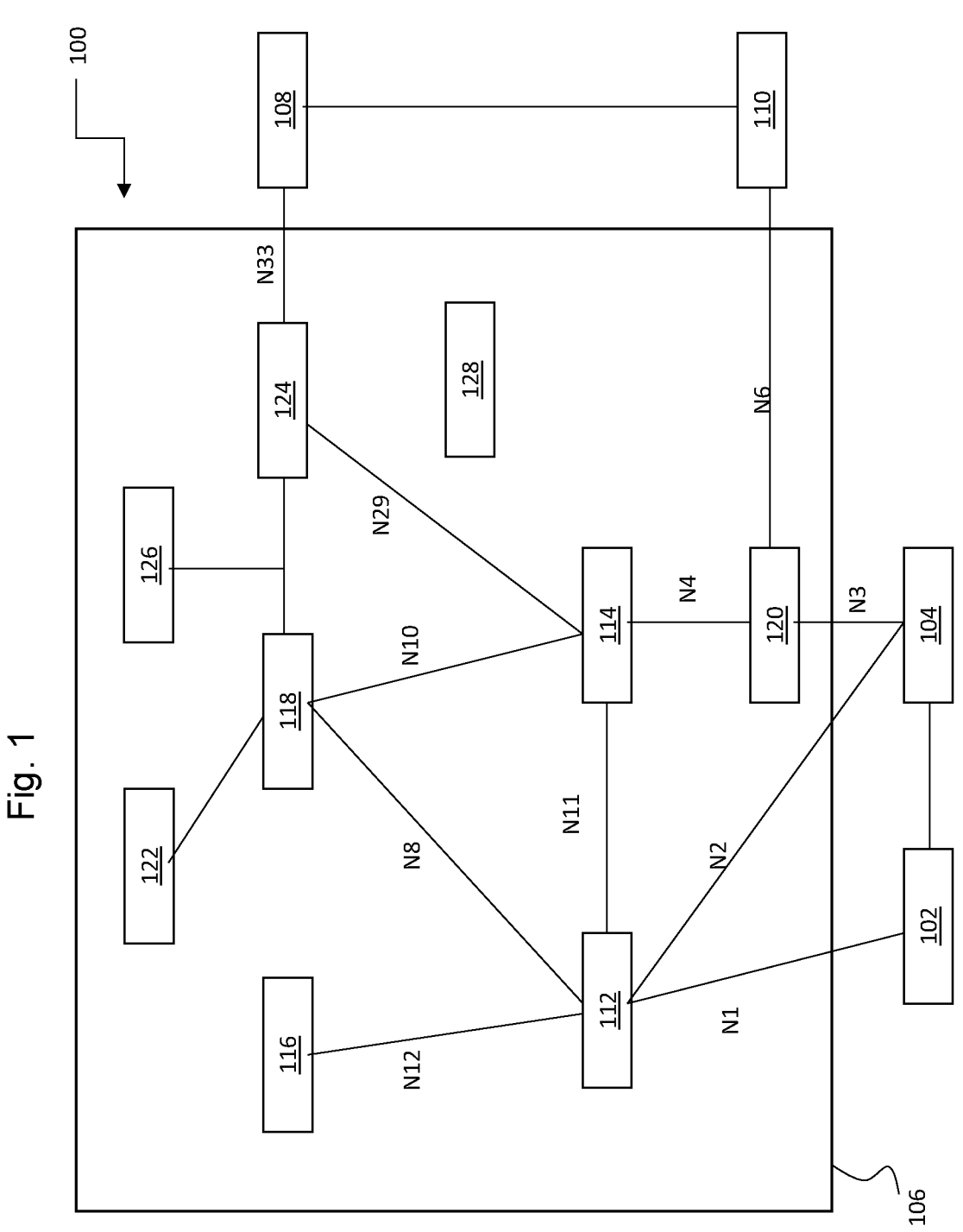
FIG. 1 shows a schematic representation of a 5G system.

FIG. 1 shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes. It is understood that although the example network element is shown as a single apparatus, that the functions of the network element may be split amongst several distinct apparatuses.

The 5GC 106 may comprise one or more network functions, including one or more Access Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. Although the NRF 128 is not depicted with its interfaces, it is understood that this is for clarity reasons and that NRF 128 may have a plurality of interfaces with other network functions. It is understood that although the example network functions are respectively shown as a single apparatus, that the functions of each network function may be split amongst several distinct apparatuses.

The NRF performs multiple functions for the 5GC 106. For example, the NRF is configured to maintain a network function (NF) profile of available NF instances and their supported services, where an NF instance identifier represents an identifier identifying a particular NF/NF instance. The NF instance identifier is provided by the network instance itself and used by the NF service consumer (i.e. a network function that is requesting a service from another entity, such as an NF service producer), and is globally unique inside the Public landline Mobile Network of the NRF in which the NF is registered. The NRF is also configured to allow other NF instances to subscribe to, and get notified about, the registration in NRF of new NF instances of a given type. The NRF is further configured to support service discovery functions by receiving NF Discovery Requests from NF instances, and provide information in respect of available NF instances fulfilling certain criteria (e.g., supporting a given service) in response to those NF Discovery Requests.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

3GPP refers to a group of organizations that develop and release different standardized communication protocols. They are currently developing and publishing documents related to Release 16, relating to 5G technology, with Release 17 currently being scheduled for 2022.

The 5G standards introduced a new architectural concept into 3GPP communication networks called the Service Based Architecture (SBA). Using this architecture, Network Functions (NFs) can be virtualized and provide their services, using defined protocols and interfaces to other network functions or external parties' "verticals" (e.g. to industrial applications such as transport, media, and manufacturing). The interfaces are referred to as service-based interfaces (SBI), and may comprise REST API-based interfaces. A REST API (also known as RESTful API) is an application programming interface (API or web API) that conforms to the constraints of REST architectural style and allows for interaction with RESTful web services. REST stands for representational state transfer (REST).

The protocols for communication between the network elements may be, for example, the common HTTP/2 Internet protocol, which is an updated version of the Hypertext Transfer Protocol (HTTP). Entities that provide a service are called "service producers" and entities requesting a service are called "service consumers". Communication procedures under 5G System Architecture are specified in 3GPP TS 23.501 and 3GPP TS 23.502.

The 5G System Architecture is defined to support the NF Service Framework that enables the use of NF services. The NF Service Framework includes a plurality of different mechanisms for enabling the use of different NF services. Examples of some of the different types of such mechanisms are discussed further below.

As a first example, the NF Service Framework that supports NF Discovery and Selection procedures is considered. Under this framework, NFs register the services they can provide with an NRF, and keep reporting their status to the NRF. NF service consumers may then discover NF service producers through the NRF by sending a discovery request to the NRF. The NRF may return an identifier of at least one service producer capable of providing a service identified in the discovery request to the service consumer. The service consumer may then select one of the identified service producers from the provided list to provide the service using NF selection logic.

3GPP TS 23.501 describes how the NF discovery and selection are done in the current SBA. Different NF types have different discovery and selection logic depending on their produced services, configuration and some dynamic information (such as, for example, load statistics). As mentioned above, in general an NF consumer will receive a list of NF producers from the NRF through the discovery procedure and select one of the NF producers from the list to which to send the service request.

As a second example, the NF Service Framework that supports direct and indirect communication models is considered. Under these models, NF Service consumers and NF Service producers may communicate directly, or indirectly via a Service Communication Proxy (SCP). Whether an NF uses direct communication or indirect communication via an SCP is based on the configuration of the NF.

'Indirect communication' thus refers to the communication between NFs or NF services via a proxy network function, such as the SCP. For clarity throughout the following, the entity that performs discovery and/or selection of a service producer and/or service consumer on behalf of another entity will be referred to herein as an SCP. However, it is understood that this functionality may instead be comprised within a different network function, either as a standalone function or as part of a set of functions.

Examples of indirect communication are now provided. Indirect communication may comprise routing service requests/responses via the SCP, with the NF service consumer discovering and selecting the NF service producer (this is also referred to as Indirect Communication without delegated discovery" or 'Model C' in the terminology of the current 3GPP specifications). Indirect communication may comprise routing service requests/responses via the SCP, with the NF service consumer delegating to the SCP the discovery and selection of the NF service producer and with the SCP being also responsible for requesting an access token on behalf of the NF Service consumer to the OAuth2 authorization server (this is also referred to as "Indirect Communication with delegated discovery" or 'Model D' of the current 3GPP specifications).

For Indirect Communication with delegated discovery, NF Service consumers do not perform any discovery or selection. The NF Service consumer instead adds any discovery and selection parameters needed to find a suitable NF Service producer for providing a particular service to the service request and sends those parameters to an SCP. The SCP uses the request address and the discovery and selection parameters in the request message to route the request to a suitable producer instance.

These communication models are illustrated with respect to FIGS. 6A to 6D.

Figure 6B:
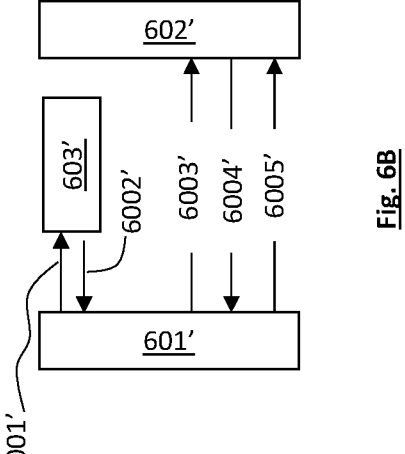
Figure 6D:
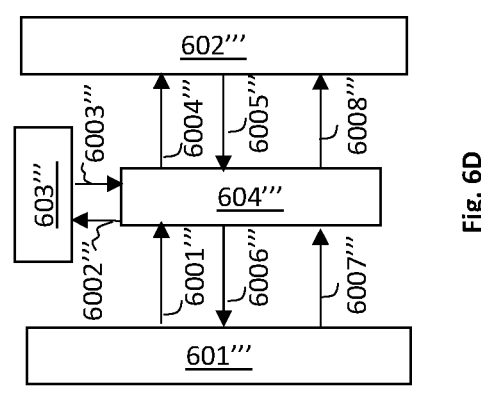
Figure 6A:
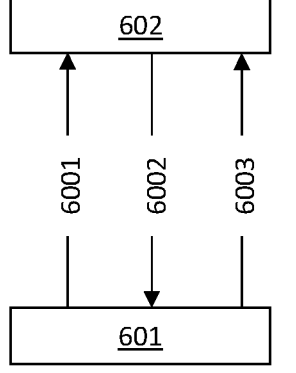

FIG. 6A illustrates potential signalling between a service consumer 601 and a service producer 602. This signalling of FIG. 6A is also referred to as Model A.

At 6001, the service consumer 601 signals a first service request to the service producer 602.

At 6002, the service producer 602 signals a service response to the service consumer 601 in response to the signalling of 6001.

At 6003, the service consumer 601 signals a second (subsequent) service request to the service producer 602.

FIG. 6B illustrates potential signalling between a service consumer 601', a service producer 602', and an NRF 603'. This signalling of FIG. 6B is also referred to as Model B.

At 6001', the service consumer 601' signals a discovery request to the NRF 603'.

At 6002', the NRF 603' signals at least one NF profile to the service consumer 601' in response to the signalling of 6001'.

At 6003', the service consumer 601' signals a first service request to the service producer 602'. The service producer 602' is associated with at least one of the NF profiles provided in the signalling of 6002'.

At 6004', the service producer 602' signals a service response to the service consumer 601' in response to the signalling of 6003'.

At 6005', the service consumer 601' signals a second (subsequent) service request to the service producer 602'.

Figure 6C:
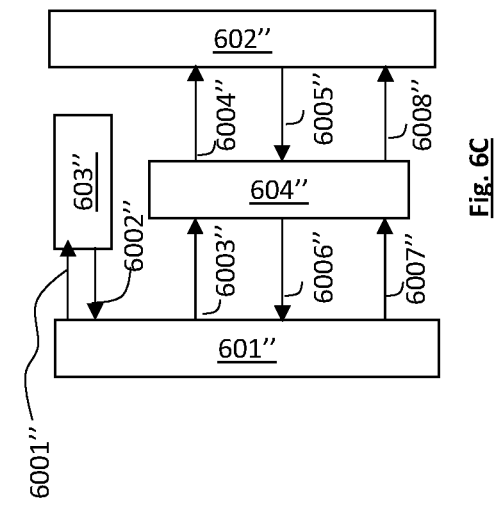

FIG. 6C illustrates potential signalling between a service consumer 601", a service producer 602", an NRF 603", and an SCP 604". This signalling of FIG. 6C is also referred to as Model C.

At 6001", the service consumer 601" signals a discovery request to the NRF 603".

At 6002", the NRF 603" signals at least one NF profile to the service consumer 601" in response to the signalling of 6001".

At 6003", the service consumer 601" signals a first service request to the SCP 604".

At 6004", the SCP 604" forwards the first service request to the service producer 602". The service producer 602" is associated with at least one of the NF profiles provided in the signalling of 6002".

At 6005", the service producer 602" signals a service response to the SCP 604" in response to the signalling of 6004".

At 6006", the SCP 604" forwards the service response of 6005" to the service consumer 601" in response to the signalling of 6003".

At 6007", the service consumer 601" signals a second (subsequent) service request to the SCP 604".

At 6008", the SCP 604" signals the second service request to the service producer 602".

FIG. 6D illustrates potential signalling between a service consumer 601''', a service producer 602''', an NRF 603''', and an SCP 604'''. This signalling of FIG. 6D is also referred to as Model D.

At 6001''', the service consumer 601''' signals a first service request to the SCP 604'''. This signalling further comprises parameters (or an indication to parameters) that are usable by the SCP 604''' to select the service producer 602'''.

At 6002''', the SCP 604''' signals a discovery request to the NRF 603'''.

At 6003''', the NRF 603''' signals at least one NF profile to the SCP 604''' in response to the signalling of 6002'''.

At 6004''', the SCP 604''' forwards the first service request to the service producer 602'''. The service producer 602''' is associated with at least one of the NF profiles provided in the signalling of 6002''', and is selected by the SCP 604'''.

At 6005''', the service producer 602''' signals a service response to the SCP 604''' in response to the signalling of 6004'''.

At 6006''', the SCP 604''' forwards the service response of 6005''' to the service consumer 601''' in response to the signalling of 6003'''.

At 6007''', the service consumer 601''' signals a second (subsequent) service request to the SCP 604'''.

At 6008''', the SCP 604''' signals the second service request to the service producer 602'''.

In current 3GPP standards, the NF service producer selection is performed in the Public Land Mobile Network (PLMN) in which the NF service consumer resides (e.g. by a Visitor PLMN when selecting an NF service producer from the Home PLMN in roaming scenarios). However, there are some drawbacks with service selection in source PLMN, or more generally in a source domain (e.g. for large PLMNs organized with different domains/regions, where each domain/region may be operated by a different organization of the same PLMN operator).

In particular, some information about the NF service producer in the target domain might be sensitive. This includes, for example, information such as data in the Unified Data Management (UDM) function, NF load/capacity/priority information, NF topology/naming information, etc. The target domain operator may be unwilling to share and/or expose such information to the source domain, i.e., to the requesting operator.

Further, it may be deemed desirable to let the target domain fully control how the selection of the NF producer within the target domain is performed. This allows the target domain to include specific policies that the target domain operator wants to enforce, e.g., for a roaming scenario, and further enables a consistent discovery and selection of producers in the target domain, while also allowing for different NF selection options for roaming and non-roaming scenarios. Moreover, this would enable the target domain to deploy its own discovery and selection algorithms/policies independently from the requesting domain, and allow NF producer selection in the target domain to be based on the target domain's operator's proprietarily-defined selection attributes and parameters.

Aside from the advantages of providing selection in the target domain, there are certain disadvantages associated with performing NF discovery and/or selection in the source domain. For example, the NF in the source domain doesn't have the best knowledge on the availability of NF producer sets and instances, e.g., load information, NF service status, etc. (Load Control Information (LCI) and Overload Control Information (OCI) are transferred backward hop-by-hop or may not even be passed across different PLMNs), the SCP in target domain has it.

It is understood that although multiple PLMNs are discussed above, that a similar/corresponding problem occurs within single PLMNs when a PLMN is split into different regions/domains by service operators. Therefore, the presently described techniques may also be applied within a single PLMN comprising multiple domains (referred to herein as the intra-domain scenario). In general, the domains may be defined according to the relevant NF that is performing the discovery and/or selection procedures. For example, for SCPs, a domain may be a configured group of one or more SCPs and zero or more NF instances accessible via the SCPs. An SCP within a configured group can communicate with any NF instance or SCP within the same group directly, i.e. without passing through an intermediate SCP. An NF (including an SCP) outside of a configured group communicates with entities within the configured domain (i.e. with at least one of the one or more SCPs and zero or more NF instances accessible via the SCPs) via an SCP.

As mentioned above, 3GPP specifications currently support direct and indirect communication between NF service consumer and producer. In the latter case, NF service consumer may delegate the NF producer selection to its SCP. In all cases of the current 3GPP specifications, NF producer selection is performed in the source domain.

In 3GPP TS 23.502, the procedure of "delegated service discovery when NF service consumer and NF service producer are in different PLMNs" is defined. This is described in reference to FIG. 7.

Figure 7:
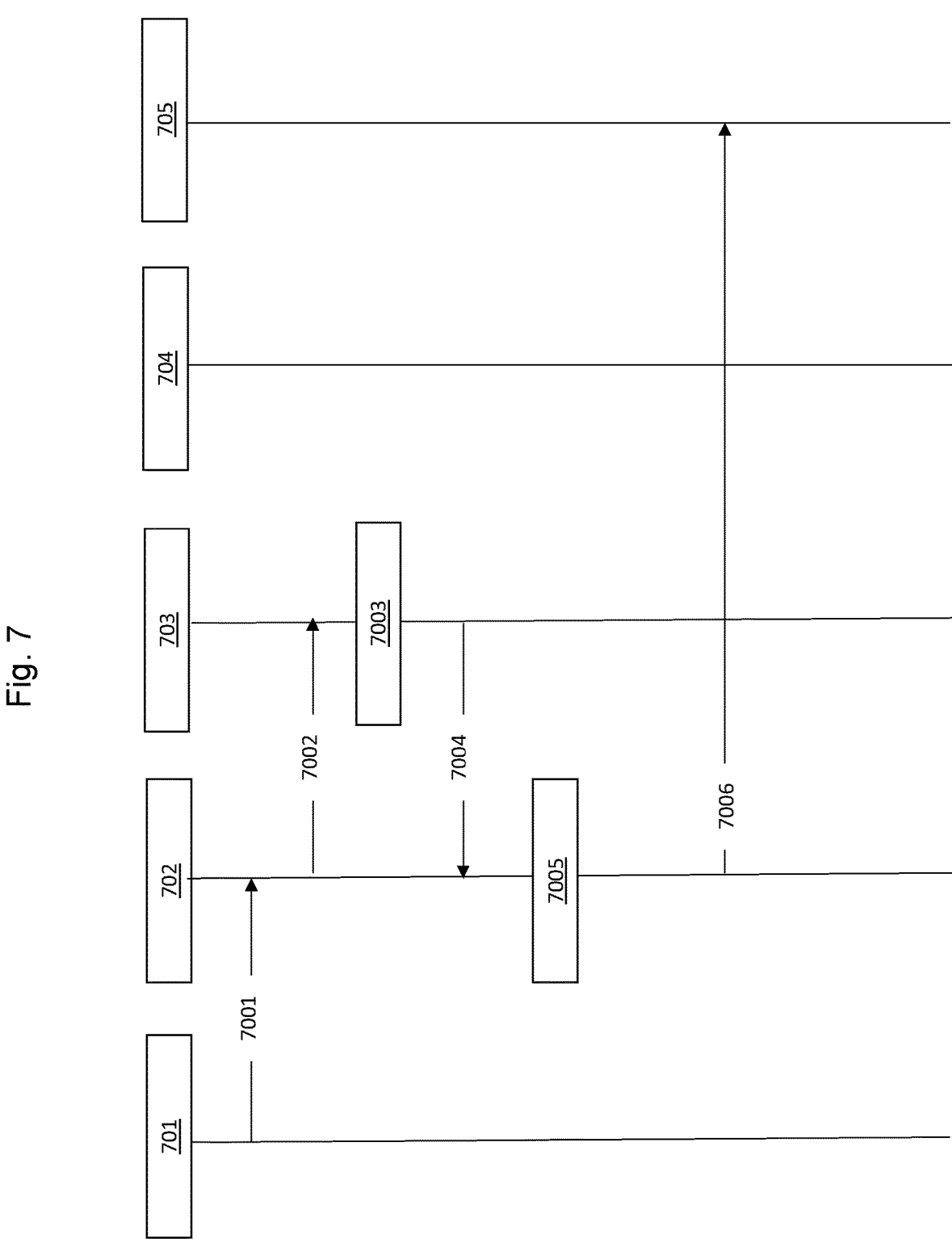

FIG. 7 is a signalling diagram showing signalling that may be performed between an NF service consumer 701, an SCP 702, a first NRF 703, a second NRF 704 and an NF service producer 705. The NF service consumer 701, SCP 702, and first NRF 703 are all located in a first PLMN/ domain and the second NRF 704 and NF service producer 705 are located in a second PLMN/domain.

At 7001, the NF service consumer 701 signals a request to the SCP 702. The request comprises a discovery request and selection parameters for discovering and selecting an NF service producer for providing a service to the NF service consumer.

At 7002, the SCP 702 signals a NF discovery request to the first NRF 703. In current 3GPP specifications, this is labelled as an Nnrf_NFDiscovery request.

At 7003, the first NRF 703 and the second NRF 704 interact to find determine at least one NF profile of NF instance(s) deployed in the second domain/PLMN that can provide the requested service.

At 7004, the first NRF 703 provides an indication of the at least one NF profile to the SCP 702. This may be performed using signalling such as an Nnrf_NFDiscovery service response message.

At 7005, the SCP 702 selects an NF service producer (in the present instance, NF service producer 705) from the provided at least one NF profile using the selection criteria/parameters provided in 7001.

At 7006, the SCP 702 signals a service request to NF service producer 705 as NF service producer 705 was the NF service producer selected in 7005.

Some mechanisms and entities have been introduced into the 3GPP SBA with the aim of helping protect information that is to be kept private within a domain. For example, 3GPP TS 23.501 describes the use of a Security Edge Protection Proxy (SEPP) to protect sensitive information, where SEPP is a non-transparent proxy and supports at least the following functionality.

An example of how SEPP may be used is now described.

For the Intra-PLMN scenario, existing 3GPP specifications (see, for example, TS 29.500) enable to delegate the selection of the NF service producer to the SCP at the NF service producer side.

Based on an SCP's specific configuration, an SCP deciding to address a next-hop SCP for a service request may delegate the NF instance and/or service instance discovery and selection to subsequent SCPs in a chain of at least two SCPs (including the initial SCP). This is based on local configuration, and messaging may use currently defined request headers to the next-hop SCP in order to address the next-hop SCP. Example request headers include the "3gpp-Sbi-Discovery-*" set of request headers.

Additionally for intra-PLMN scenarios, an SCP may register its profile in NRF whether it supports Indirect communication with delegated discovery (i.e. whether the SCP supports model D). This allows for another SCP to discover whether SCP at the service producer side supports delegated discovery, and if so, to delegate the discovery and selection of network functions on that service producer side of the network to the SCP on the service producer side.

This is not supported for inter-PLMN scenarios, since an NF on the service consumer side and/or the SCP on the service consumer side is not expected to discover SCP in the target PLMN. Instead, signaling is routed via SEPPs to the target PLMN, in which the target SEPP (i.e. an SEPP in the target/producer domain) can determine whether to route the request to an producer-side NF via a producer-side SCP). This operation is described, for example, in 3GPP TS 29.510.

3GPP TS 29.510 defines an NF Discovery service operation as an operation that provides to a NF service consumer or an SCP, at least one profile (including IP address(es) or Fully Qualified Domain Name (FQDN)) associated with the NF Instance(s) or NF Service(s) or SEPP instances matching certain input criteria. The NF Discovery service operation also provides to the SCP the profile (including IP address(es) or FQDN) of the SCP Instance(s) matching certain input criteria.

3GPP TS 29.510 further defines that the NF Discover service operation may be invoked by an NF Service Consumer (also referred to herein as a "source NF") or by an SCP requesting to discover NF instances (also referred to herein as "target NFs") located in the same PLMN, or in a different PLMN, or SEPP instances located in the same PLMN. The NF Discover operation may also be invoked by an SCP requesting to discover SCP instances located in the same PLMN.

The SEPP can help protect sensitive information in at least the following ways.

First, the SEPP supports message filtering and policing on inter-PLMN control plane interfaces. However, it is noted that the SEPP protects the connection between Service Consumers and Service Producers from a security perspective and does not duplicate the Service Authorization applied by service producers themselves.

Second, the SEPP supports topology hiding such that the structure and/or hierarchy of the domain being protected is not transparent to other domains.

To address at least one of the above-mentioned issues, the following discloses procedures and apparatus for enabling an SCP in the target domain (i.e. a domain in which the target network function resides) to perform service discovery and selection when two network domains are involved. This SCP will be referred to herein as a "producer SCP". The network domains may be, for example, different PLMNs, different Non-Public Networks (NPNs), and/or different SCP domains.

In this mechanism, there may still be an SCP on the NF service consumer side. This SCP will be referred to herein as a "consumer SCP". The consumer SCP and the producer SCP may be respectively associated with the consumer NF and the producer NF. The producer SCP and the consumer SCP may be comprised within a same SCP entity.

Therefore, the following discloses utilizing SCPs in the target and/or source domains to participate in NF discovery and/or selection for determining an NF to provide a service and/or for determining an NF to consume a service. The SCPs may forward a Service Request with NF Discovery and Selection parameters to appropriate entities in the target domain. The producer SCP in the target domain, on receiving a forwarded service request from the source/consumer domain, fetches a list of at least one potential NF Producers from the NRF in the target domain (also referred to herein as the producer NRF), and selects a single NF Producer using the received selection parameters.

The indication that the Discovery and Selection procedures are to be performed in the target domain may be signalled using a HTTP custom header. The Discovery and Selection parameters may be signalled together with a service request body to the producer SCP.

When the consumer NF instance that is supposed to receive the NF Service Notification becomes unresponsive or fails in some other regard, a procedure may be applied to select an alternative NF instance to receive the NF Service Notification. In this case, the consumer NF instance may be considered as being in the "target" domain as an alternative consumer NF is to be determined. The presently described techniques may also be applied in respect of such a case.

In order to implement the presently described techniques, at least some entities in the source and target domains are configured to support the feature of delegating NF selection to the target domain. In particular, the consumer SCP, the producer SCP, and at least one of the consumer NRF (i.e. the NRF associated with the source domain) and the producer NRF (i.e. the NRF associated with the target domain) may be configured to support the delegation.

In case of selecting a producer NF in the target domain, the consumer SCP may be informed of the support for the presently described procedures in at least one of a plurality of different ways. For example, the consumer SCP may be manually configured with this information in the source domain. As another example, the consumer SCP may receive an indication of this support through signalling, such as in the Discovery Response message received in response to an initial Discovery message. As a further example, the consumer SCP may be informed as a result of bootstrapping procedures performed by NRFs respectively located in the source and target domains.

When the consumer SCP is configured manually by the network operator, the consumer SCP is provisioned with a list of NF types for which the target domain's SCPs support delegated discovery and selection. Depending on the granularity of configuration, the list of NF types may be replaced by a wildcard list of the whole target domain. When a wildcard list is used, this means that delegated discovery and selection to the target domain's SCPs is supported for all NF types in the target domain.

When manual configuration has not been provided, then at least one of the other two examples mentioned above may be used to inform the consumer SCP of the current policy.

Figure 8:
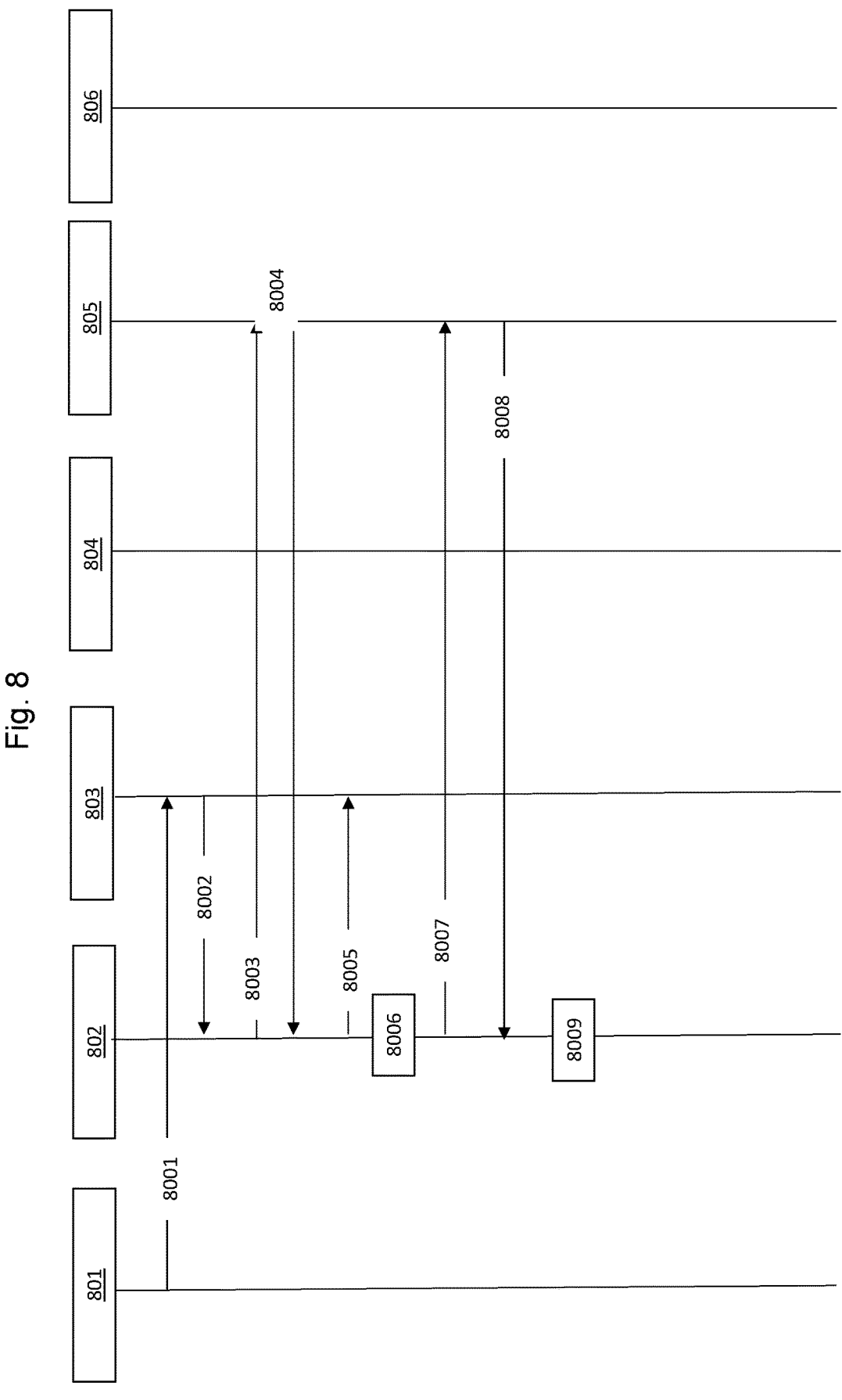

These two examples are illustrated with respect to FIG. 8. These are discussed further below.

FIG. 8 shows signalling that may be performed between a consumer NF 801, a consumer NRF 802 and a consumer SCP 803 (all of which are located in a first/source domain), and a producer SCP 804, a producer NRF 805 and a producer NF 806 (all of which are located in a second/target domain).

At 8001, the consumer NF 801 sends a service request to the consumer SCP 803. The service request comprises a request for a service. The service request may comprise, for example, discovery and selection parameters. The discovery and selection parameters may be usable for selecting an NF for performing the service requested in the service request.

At 8002, the consumer SCP 803 sends a discovery request to the consumer NRF 802 to discover at least one NF capable of performing the service requested in 8001. This discovery request may be a request defined in 3GPP, such as, for example, an NRF_NFDiscovery Request.

The message may be sent using an existing format, or using a new format.

As an example of an existing format, the target NF type in the NF Discovery request comprises the target NF for the NF service request.

As an example of using a new message format, the target NF type in the NF Discovery request may be set to "SCP" to discover whether SCPs exist in the target domain that supports delegated discovery. For this case, the SCP profile registered in the NRF may be enhanced with a new attribute that indicates for which target NF types delegated discovery to the target domain is supported, and/or required and/or desired.

At 8003, the consumer NRF 802 sends an NF discovery request to the producer NRF 805. This discovery request of 8003 may comprise an indication that the source domain supports delegation of discovery requests to SCPs in other domains.

At 8004, assuming that the delegation feature is enabled by configuration in the target domain, the producer NRF 805 provides a response to the signaling of 8003. This response may comprise an identifier and/or an address for the producer SCP 804. This identifier and/or address may be, for example, a uniform resource identifier (URI). The response may comprise an indication whether or not the second/target domain supports delegated discovery for the requested producer NFs (i.e. NFs located in the second/target domain). The response may comprise an indication whether or not the second/target domain requires, and/or desires delegated discovery for the requested producer NFs. The response may comprise an indication of the supported discovery parameters for the requested discovery procedures supported for the requested NF/list of NFs that support delegation in the second/target domain. This indication of the discovery procedures may be provided using, for example, a bitmap.

At 8005, the consumer NRF 802 signals a response to the consumer SCP 803 for the discovery request of 8002. This response comprises an indication that the consumer SCP 803 should delegate selection of the producer NF 806 to the producer SCP 804. Although not shown in this signaling diagram, the consumer SCP 803 uses this indication to delegate selection of the producer SCP 806 to the to the producer SCP 804.

At 8006, the consumer NRF maintains a mapping of the selection mode supported by the second/target domain. This mapping may be consulted for responses to subsequent NF discovery requests received from SCPs instead of re-performing the signaling of 8003 to 8004.

This mapping may be maintained in a cache. Each entry in the table may have a respective associated validity period field indicating how long that entry is valid. After the validity period expires, the respective entry should be deleted. This allows the NRF to respond to subsequent NF Discovery requests issued by SCPs (or NFs) in the source domain and targeting the target domain without having to interact with the NRF in the target domain, if information is available (and valid) in the cache. The validity period may be provided in the signaling of 8004. The validity period may be defined by an operator of the source domain. When the validity period has expired for a particular mapping, the consumer NRF 802 may automatically delete this mapping. When the validity period has expired for a particular mapping, the consumer NRF 802 may automatically attempt to obtain new mapping information for the particular mapping.

Steps 8007 to 8009 show the example of using NRF bootstrapping to obtain the selection/delegation mode of the target domain. These steps may be performed without receipt of signaling as a trigger (such as the signaling of 8002). For example, this operation may be performed during startup of the consumer NRF 802 in the source domain. However, it is understood that the signaling of 8002 may in fact act as a trigger for this bootstrapping mechanism depending on the specific implementation.

At 8007, the consumer NRF 802 signals a bootstrapping message to the producer NRF 805. The bootstrapping message comprises an inquiry as to which types of network functions in the second/target domain supports delegated discovery. The bootstrapping message may enquire as to which types of network functions in the second/target domain requires delegated discovery for the requested producer NFs.

At 8008, the producer NRF 805 signals a response to the consumer NRF 802 in response to the inquiry of 8007. This response may indicate which types of network functions in the second/target domain supports delegated discovery. This response may indicate which types of network functions in the second/target domain requires delegated discovery for the requested producer NFs. This response may comprise an identifier and/or an address for the producer SCP 804. This identifier and/or address may be, for example, a uniform resource identifier (URI). The response may comprise an indication whether or not the second/target domain supports delegated discovery for the requested producer NFs (i.e. NFs located in the second/target domain). The response may comprise an indication whether or not the second/target domain requires, and/or desires delegated discovery for the requested producer NFs. The response may comprise an indication of the supported discovery parameters for the requested discovery procedures supported for the requested NF/list of NFs that support delegation in the second/target domain. This indication of the discovery procedures may be provided using, for example, a bitmap.

At 8009, the consumer NRF maintains a mapping of the selection mode supported by the second/target domain. This mapping may be consulted for responses to subsequent NF discovery requests received from SCPs instead of re-performing the signaling of 8007 to 8008 (and/or the signaling of 8003 to 8004).

This mapping may be maintained in a cache. Each entry in the table may have a respective associated validity period field indicating how long that entry is valid. After the validity period expires, the respective entry should be deleted. This allows the NRF to respond to subsequent NF Discovery requests issued by SCPs (or NFs) in the source domain and targeting the target domain without having to interact with the NRF in the target domain, if information is available (and valid) in the cache. The validity period may be provided in the signaling of 8004. The validity period may be defined by an operator of the source domain. When the validity period has expired for a particular mapping, the consumer NRF 802 may automatically delete this mapping. When the validity period has expired for a particular mapping, the consumer NRF 802 may automatically attempt to obtain new mapping information for the particular mapping.

Although not shown, the consumer NRF 802 in this bootstrapping example may provide the indication of delegation in the second domain to the consumer SCP 803 in a similar manner to the signaling of 8005 in response to receipt of a discovery request from the consumer SOP 803.

In order to transmit the information of the NF producers for which delegated discovery and selection in the target domain is supported/desired, the parameters may defined e.g. in the payload of 8008 (and/or the signalling of 8004) in the following manner.

TABLE 1

| Definition of header parameters to indicate NF producers that support delegation | | |
| --- | --- | --- |
| Attribute name | Data type | Description |
| NfTypes | array | This information element defines a list of NF types for which delegated discovery and selection in the target domain is supported/desired. The list may have 1 entry to only respond to the NF type that is queried by the source domain. With a different configuration, the list may include more than |

TABLE 1-continued

Definition of header parameters to indicate
NF producers that support delegation

| Attribute name | Data type | Description |
|---|---|---|
|  |  | 1 NF types to save the signaling for other potential NF producers in the future. The list may also include a single entry with a wildcard NF type to indicate that delegated discovery and selection in the target domain is supported/desired for all NF types. It may have 0 entry (empty array) to indicate that this feature is not supported or not enabled. |
| Discovery parameters | bitmap | When provided, this Information element contains the supported discovery parameters |

Once configured with one of the previously mentioned approaches, the end-to-end procedure of an NF Service Request and Response may be performed. This is illustrated with reference to the example of FIG. 9.

Figure 9:
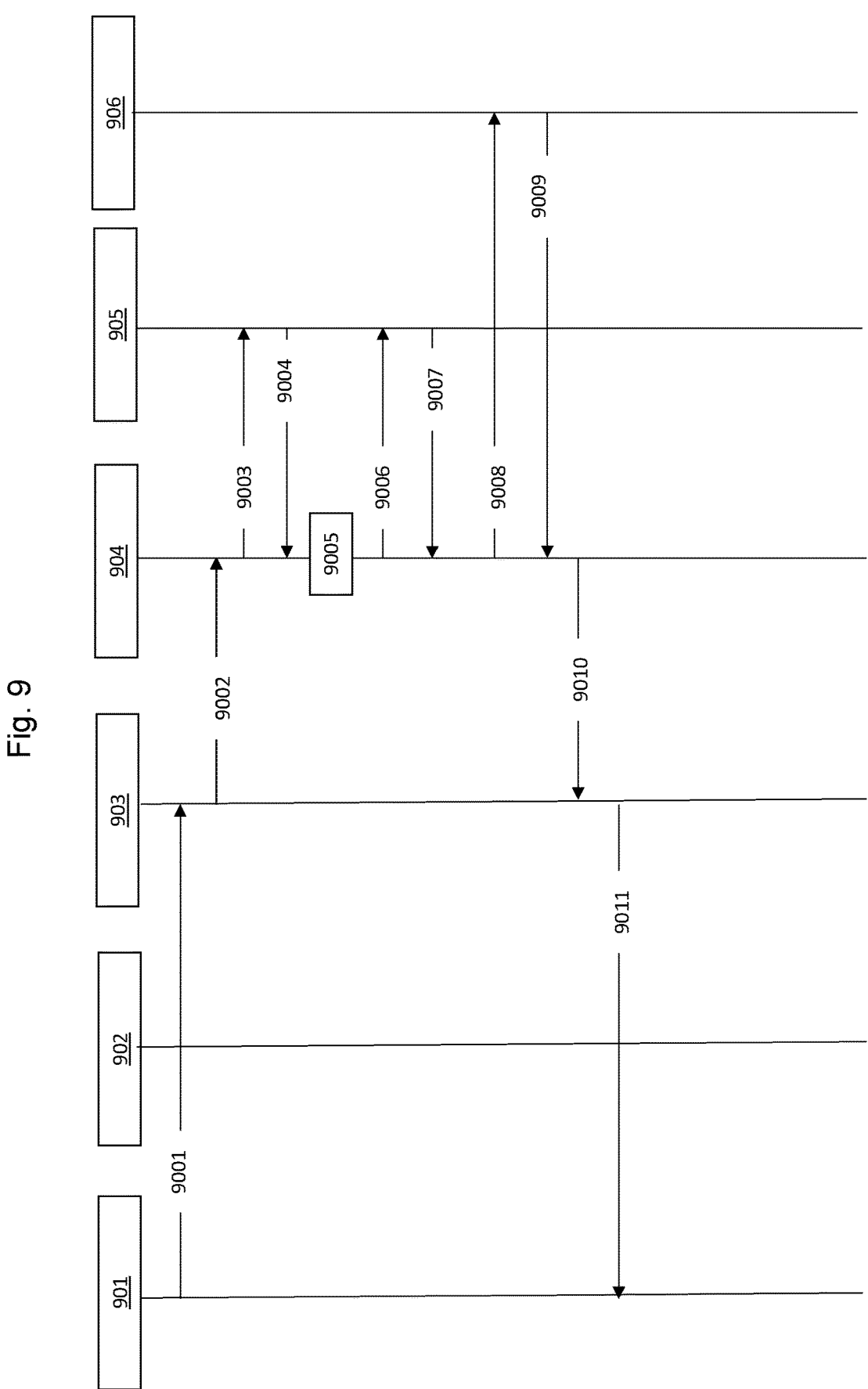

FIG. 9 shows signaling that may be performed between a consumer NF 901, a consumer NRF 902 and a consumer SCP 903 (all of which are located in a first/source domain), and a producer SCP 904, a producer NRF 905 and a producer NF 906 (all of which are located in a second/target domain).

At 9001, the consumer NF 901 sends a service request to the consumer SCP 903 (this may be, for example, as described above in reference to 8001). The service request comprises a request for a service. The service request may comprise, for example, discovery and selection parameters. The discovery and selection parameters may be usable for selecting an NF for performing the service requested in the service request.

At 9002, the consumer SCP 903 recognizes the signalling of 9001 as an inter-domain Service Request, and sends a service request to the producer SCP 904. The consumer SCP 903 may recognize the signalling as an inter-domain service request by examining the target domain identifier comprised in the service request.

The service request comprises a request for a service. The service request may comprise, for example, discovery and selection parameters. The discovery and selection parameters may be usable for selecting an NF for performing the service requested in the service request.

When signalling the message to the producer SCP, the service request may be routed through SEPP in inter-PLMN scenarios (e.g. from consumer SCP to a consumer SEPP, from the consumer SEPP to a producer SEPP, and from the producer SEPP to the producer SCP). The SEPPs are not shown in the signaling diagram of FIG. 9.

The URI comprised within the service request of 9002 may be altered at each entity/each hop so as to comprise the URI/address of the next hop to receive the signaling. For example, the signaling sent from consumer SCP to the consumer SEPP comprises the URI of the consumer SEPP. Additionally, if the consumer SPC obtained a target producer SCP URI from the producer NRF (such as during at least one of the processes described above in relation to FIG. 8), the service request may additionally includes a header set associated with that target URI. A suitable header set is currently labelled as the 3gpp-Sbi-Target-apiRoot in 3GPP. The provision of the header set may enable the producer SEPP to route the request to that specific producer SCP. Otherwise, the producer SEPP determines by its own the producer SCP towards which the request is routed. The Request is eventually forwarded to the producer SCP in the target domain.

In case of inter-NPN/SCP communication, the NPN identifier/SCP Domain identifiers would replace the source domain identifier in the forwarded request.

At 9003, the producer SCP 904 sends an NF discovery request to the producer NRF.

At 9004, the producer NRF responds to the signaling of 9003 with an NF discovery response message.

At 9005, the producer SCP 904 performs an NF selection for the service request received in 9002 using the parameters received in 9002. In the present instance, the producer NF 906 is selected.

At 9006, the producer SCP 904 signals to the producer NRF 905 a request for an access token of the producer NF. This may be performed using, for example, an Nrf_AccessToken_Get Request message.

At 9007, the producer NRF 905 signals producer SCP 904 with a response to the signaling of 9006. The response may comprise an access token of the producer NF. This may be performed using, for example, an Nrf_AccessToken_Get Response message.

At 9008, the producer SCP 904 signals to the producer NF 906 an NF service request. The service request may comprise the token received in 9007.

At 9009, the producer NF 906 responds to the signaling of 9008 with an NF service response.

At 9010, the producer SCP 904 forwards the NF service response received in 9009 to the consumer SCP 903, which in turn forwards the NF service response to the consumer NF 901 at 9011.

The presently described mechanisms may co-exist with existing legacy procedures. To help effect this, the following describes some receiver mechanisms that may be performed when errors occur as a result of legacy systems interacting with the presently described procedures.

When the indication of NF selection preference/ability is manually configured, at least two errors may originate in legacy systems.

First, when the NF_Service_Request including the discovery parameters is forwarded to the target domain, the producer NRF in the target domain may not support one or more of the indicated discovery parameters.

This may be addressed in at least two different ways.

In a first mechanism, while deciding the list of potential NF Producers, the producer NRF can ignore any unsupported discovery parameter(s), e.g. when they only indicate preference parameters that need not be matched necessarily.

In a second mechanism, the producer NRF may return a response that comprises an indicator of which discovery parameters(s) are unsupported to the producer SCP, which in turn forwards the error message to the consumer SCP in the source domain.

Second, when the target domain does not support delegated service discovery and selection, the producer SCP may not know how to react after it receives an NF_Service_Request from an external domain and may return a Response Error indicating the feature of delegation is not supported in the target domain.

Figure 10:
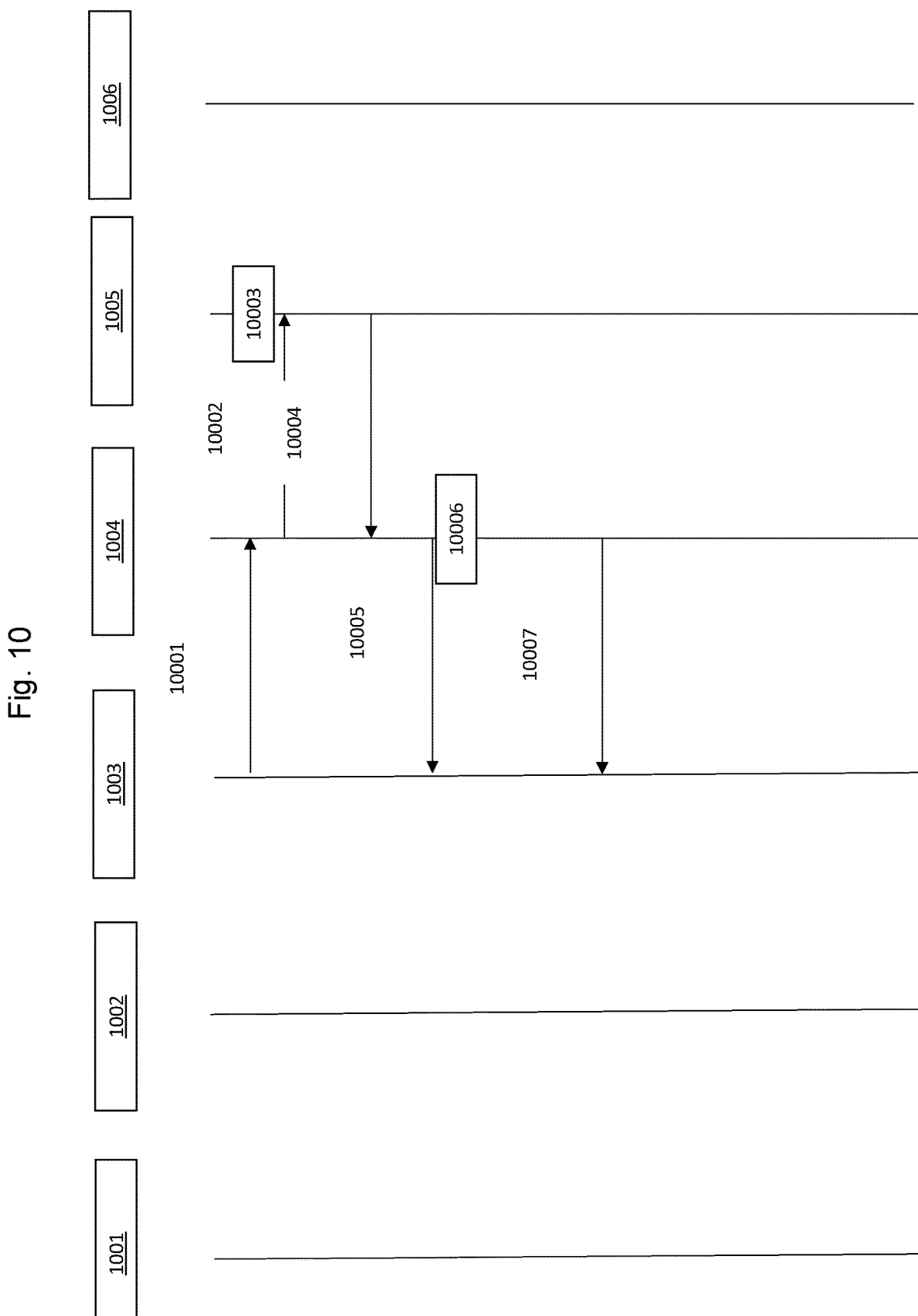

These two issues are illustrated with respect to FIG. 10.

FIG. 10 shows signalling that may be performed between a consumer NF 1001, a consumer NRF 1002 and a consumer SCP 1003 (all of which are located in a first/source domain), and a producer SCP 1004, a producer NRF 1005 and a producer NF 1006 (all of which are located in a second/ target domain).

At 10001, the consumer SCP 1003 sends an NF service request to the producer SCP 1004. This service request comprises NF discovery and selection parameters for the producer SCP to use to select the producer NF 1006.

When the discovery parameters are not supported in the second domain, the steps of 10002 to 10005 are performed.

At 10002, the producer SCP 1004 sends an NF discovery request to the producer NRF, the discovery request comprising the discovery parameters.

At 10003, the producer NRF 1005 determines that at least one of the discovery parameters comprised in the signaling of 10002 are not supported in the second domain.

At 10004, the producer NRF 1005 responds to the signaling of 10002 with an indication that at least one of the discovery parameters comprised in the signaling of 10002 are not supported in the second domain. This response may further comprise an identification of the unsupported discovery parameter(s).

At 10005, the producer SCP 1004 forwards the error message (or sends a message comprising corresponding information to the error message of 10004) to the consumer SCP.

When delegation is not supported in the target domain, the signalling of 10006 and 10007 may be performed in response to the signaling of 10001.

At 10006, the producer SCP determines that the producer SCP does not support the requested delegated discovery.

At 10007, in response to the determination the producer SCP 1004 signals to the consumer SCP 1003 that the producer SCP does not support the requested delegated discovery.

The presently described system of delegating may also be applied to other scenarios, such as, for example, NF service notification. In this case, the consumer NF (e.g., AMF in the visitor PLMN) may subscribe to events of the producer NF (e.g., Unified Data Management function in the home PLMN). When the subscribed-to event takes place, the producer NF sends a notification message to the consumer NF. When the original consumer NF with the subscription is unreachable, a new consumer NF needs to be discovered and selected. Such discovery and selection process can also be performed in the target domain where the consumer NF resides. Notably, this procedure shares much similarity with the procedure mentioned above.

To achieve the delegation of selecting a recipient for a subscription, both domains are configured with the delegation settings. This may be performed in at least one of the following three ways.

First, the domains may be manually configured by a domain operator with a list of NF types that support delegated discovery and selection for the NF Service Notification. Depending on the granularity of configuration, the list of NF types may be replaced by a wildcard list of the whole domain, meaning all NF types in the domain support delegation.

Second, the producer NRF may send an NRF Discovery Request to consumer NRF for a new consumer NF in the target domain. The consumer NRF replies with the same request message but adds an indication of the support of consumer NF discovery and selection in the target domain (i.e., in the target domain itself). After detecting such an indication from the returned message, the producer NRF sends a message to the producer SCP that notifies the producer SCP to reselect an alternative consumer NF for the subsequent notification. The producer NRF also maintains a mapping of the NFs expecting notifications in the remote domain and the supported mode, i.e., whether it supports delegation, as well as a timer of the information's validity period. This is illustrated with respect to FIG. 11, which is discussed further below.

Third, both network domains may leverage the bootstrapping procedure of NRFs to inform each other's support of delegation.

Figure 11:
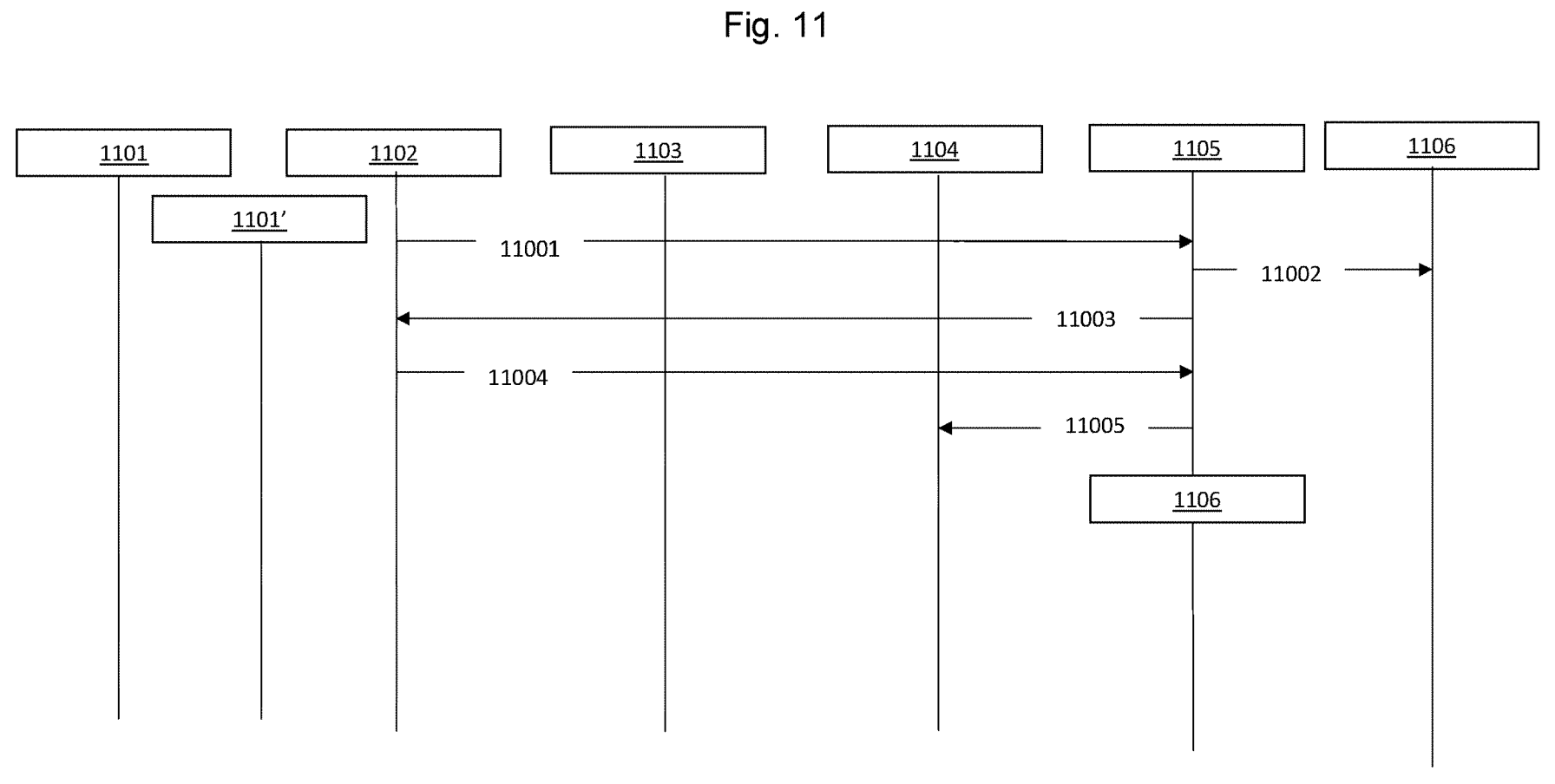

FIG. 11 shows signalling that may be performed between a first consumer NF 1101, a second consumer NF 1101', a consumer NRF 1102, and a first consumer SCP 1103 (all of which are located in a second/target domain), and a producer SCP 1104, a producer NRF 1105 and a producer NF 1106 (all of which are located in a first/source domain), when the first consumer NF 1101 is unreachable and thus a second consumer NF 1101' needs to be selected.

At 11001, the consumer NRF 1102 signals the producer NRF 1105 a notification indicating that the first consumer NF 1101 is unreachable.

At 11002, in response to the signaling of 11001, the producer NRF 1105 signals the producer NF 1106 to indicate that the first consumer NF 1101 is unreachable.

At 11003, further in response to the signalling of 11001, the producer NRF 1105 signals the consumer NRF 1102 a request to discover a new consumer NF in the first domain.

At 11004, in response to receipt of the signaling of 11003, the consumer NRF 1102 sends a request to the producer NRF 1105 that indicates that the target domain supports discovery and selection of a new consumer network function. In this manner, network entities in both the source and target domain may be made aware that a new consumer network function is needed.

At 11005, in response the signalling of 11004, the producer NRF 1105 signals the producer SCP 1104 to delegate selecting a new consumer network function to the consumer SCP 1103.

At 11006, the producer NRF 1105 maintains a mapping of the new consumer NF and the support mode of the source domain.

After being configured with the delegation preferences, when an intended consumer NF for NF Service Notification is unreachable, the consumer NRF notifies the producer NF (via the producer NRF) that the consumer NF has been de-registered or is not operative. The subsequent notification messages are sent by producer SCP to the consumer SCP in the target domain, adding a discovery header (which may comprise the NF set ID) and removing the target URI. The producer SCP may further indicate its ability and/r desire to delegate the discovery and selection to the target domain.

The consumer SCP reacts to this message by selecting an alternative consumer NF accordingly. An identifier/address of the alternative consumer NF (such as an URI of the alternative consumer NF) is sent towards the producer NF for future new notifications. This procedure is illustrated with reference to FIG. 12.

Figure 12:
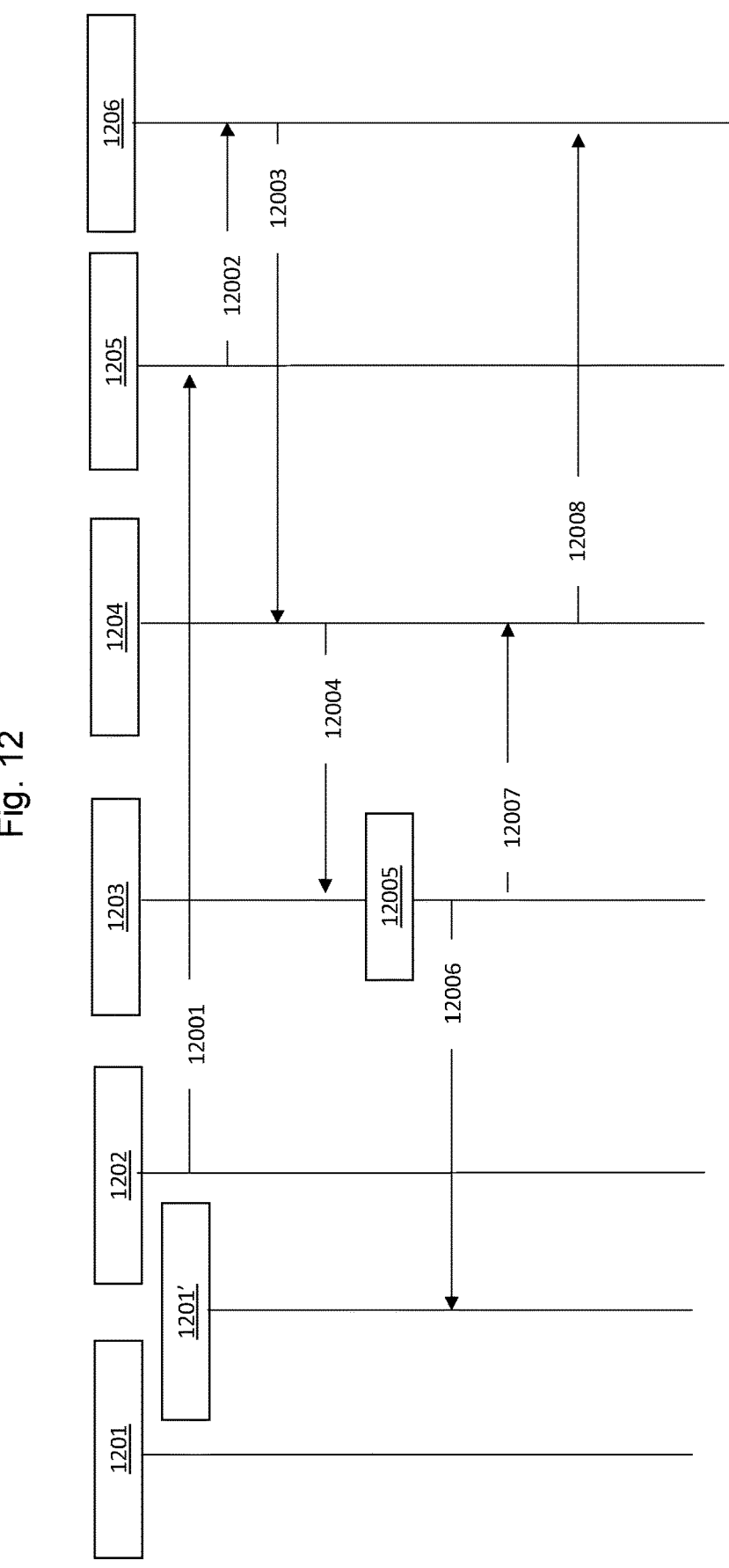

FIG. 12 shows signalling that may be performed between a first consumer NF 1201, a second consumer NF 1201', a consumer NRF 1202, and a first consumer SCP 1203 (all of which are located in a second/target domain), and a producer SCP 1204, a producer NRF 1205 and a producer NF 1206

(all of which are located in a first/source domain). The signalling of FIG. 12 relates to signalling performed when an upcoming NF notification is to be sent to a consumer of the service provided by the producer NF. In contrast, the signalling of FIG. 11 relates to a procedure for informing entities in the first/source domain (e.g. the producer NRF and the producer SCP) that delegated discovery and selection of a new NF service notification consumer can be performed in the target domain.

At 12001, the consumer NRF 1202 signals the producer NRF 1205 a notification indicating that the first consumer NF 1201 is unreachable.

At 12002, in response to the signalling of 12001, the producer NRF 1205 signals the producer NF 1206 to indicate that the first consumer NF 1201 is unreachable.

At 12003, the producer NF 1206 signals an NF service notification to the producer SCP 1204. This NF service notification may comprise a discovery header to indicate that discovery of an NF is requested. A discovery header may have a particular form for indicating that discovery of an NF is requested. This NF service notification may be signalled when a next service notification is scheduled to be transmitted. In other words, the NF service notification may not be transmitted immediately in response to the signalling of 12002, but may instead wait until a scheduled time. The scheduled time may occur periodically.

At 12004, in response to the signalling of 12003, the producer SCP 1204 sends an NF service notification request to the consumer SCP 1203. The NF service notification request comprises a discovery header for indicating that discovery of an NF is requested. A discovery header may have a particular form for indicating that discovery of an NF is requested. The discovery request may request that an alternative consumer NF be selected from a same NF set, where NFs in a set are all the same type of NF. This signalling does not comprise an identifier/address of a consumer NF (such as a URI associated with a consumer NF).

At 12005, the consumer SCP 1203 performs discovery of an alternative consumer NF in response to the signalling of 12004, and determines that the second consumer NF 1201' is to be selected.

At 12006, the consumer SCP 1203 signals the received service notification of 12004 to the second consumer NF 1201' in response to the selection of 12005.

At 12007, the consumer SCP 1203 signals a service notification response to the producer SCP 1204 in response to the selection of 12005. This response comprises an address and/or an identifier for the selected second consumer NF 1201'. The address/identifier may be, for example, a URI.

At 12008, the producer SCP 1204 signals the address/identifier received at 12007 to the producer NF 1206.

FIGS. 13 to 16 relate to operations that may be performed by various of the apparatus described herein.

FIG. 13 illustrates operations that may be performed by an apparatus for a second network repository function.

At 1301, when/while operating in a second domain, the apparatus signals an indication to a first network repository function operating in a first domain, the indication indicating whether at least one network entity in the second domain is capable of performing discovery and/or selection of a network function instance in the second domain on behalf of a network entity located in the first domain.

This signalling may be performed as part of a service notification procedure, as described herein. This signalling may be performed as part of a service request procedure, as described herein.

The at least one network entity may be a service communication proxy (or an entity performing a similar function). Depending on the entity requesting, the network function instance in the second domain may be a producer network function or a consumer network function.

The apparatus may be caused to receive signalling from the first network repository function, the signalling comprising a first request requesting said indication, and wherein the first request is performed as part of a bootstrapping procedure.

The apparatus may be caused to receive signalling from the first network repository function, the signalling comprising a first request requesting said indication, and wherein the first request is comprised within a discovery request.

The apparatus may be caused to: receive, from the first network repository function, an indication that a network function instance in the first domain is to be selected as at least one of: a consumer of a service provided by a network function instance in the second domain; and, in response to said receiving, transmit, to a second communication proxy located in the second domain, an instruction to delegate discovery and/or selection of said network function instance to a network entity located in the first domain. As one example, this may be as described above in relation to 11004 and 11005.

The discovery request may be: a request to discover a network function instance providing a requested service, and/or a request to discover a service communication proxy in the second domain that is capable of performing said discovery and/or selection.

The first indication may indicate at least one network entity in the second domain that is capable of performing discovery and/or selection of the network function instance. The first indication may indicate at least one type of network function in the second domain that is capable of being discovered and/or selected as the network function instance by a network entity in the second domain. The first indication may comprise at least one identifier and/or address of the network entity in the second domain that is capable of performing discovery and/or selection of the network function instance. The first indication may not comprise profiles of any network function instances.

The first indication may indicate that there are no network entities in the second domain that are capable of performing discovery and/or selection of the network function instance.

The apparatus may be caused to maintain a store of said indication.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

FIG. 14 illustrates potential operations that may be performed by a first network repository function while operating in a first domain.

At 1401, the apparatus receives a first indication from a second network repository function operating in a second domain, the first indication indicating whether at least one network entity in the second domain is capable of performing discovery and/or selection of a network function instance in the second domain on behalf of a network entity located in the first domain.

At 1402, in response to said receiving, the apparatus transmits, to a first network entity located in the first domain, an instruction to delegate discovery and/or selection of said network function instance to a network entity located in the second domain.

The at least one network entity may be a service communication proxy (or an entity performing a similar function). Depending on the entity requesting, the network function instance in the second domain may be a producer network function or a consumer network function.

The apparatus may be caused to: signal to the second network repository function a first request requesting the first indication, wherein the first request is comprised within a bootstrapping request.

The apparatus may be caused to: signal to the second network repository function a first request requesting the first indication, wherein the first request is comprised within a discovery request.

The apparatus may be caused to: receive, from a network entity located in the first domain, a second request to discover the network function instance in the second domain; and signal the second network repository function a first request for said first indication in response to receiving said second request.

The apparatus may be caused to transmit to the second network repository function a second indication indicating whether at least one network entity in the first domain is capable of performing discovery and/or selection of a network function instance in the first domain on behalf of a network entity located in the second domain.

The discovery request may be: a request to discover a network function instance providing a requested service, and/or a request to discover a service communication proxy in the second domain that is capable of performing said discovery and/or selection.

The first indication may indicate at least one network entity in the second domain that is capable of performing discovery and/or selection of the network function instance. The first indication may indicate at least one type of network function in the second domain that is capable of being discovered and/or selected as the network function instance by a network entity in the second domain. The first indication may comprise at least one identifier and/or address of the network entity in the second domain that is capable of performing discovery and/or selection of the network function instance. The first indication may not comprise profiles of any network function instances.

The first indication may indicate that there are no network entities in the second domain that are capable of performing discovery and/or selection of the network function instance.

The apparatus may be caused to maintain a store of said indication.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

FIG. 15 illustrates potential operations that may be performed, for example, by an apparatus for a first network entity when operating in a first domain comprising a first network function instance.

At 1501, the apparatus receives signalling for a second network function instance located in a second domain, the signalling not identifying the second network function instance.

At 1502, the apparatus obtains an indication of a second network entity operating in a second domain that is capable of performing discovery and/or selection of a network function instance in the second domain.

At 1503, the apparatus signals a request to the second network entity, the request requesting that the second network entity performs discovery and/or selection of the second network function instance.

The apparatus may be caused to obtain said indication of the second network entity by performing a discovery procedure with a first network repository function that is located in the first domain.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

FIG. 16 illustrates potential operations that may be performed by an apparatus for a second network entity when operating in a second domain comprising at least one network function instance.

At 1601, the apparatus receives, from a first network entity in a first domain, a request requesting that the second network entity performs discovery and/or selection of a network function instance.

At 1602, the apparatus initiates discovery and/or selection of a network function instance of said at least one network instance comprised in the second domain.

At 1603, the apparatus sends the received request to the selected network function instance.

The apparatus may be caused to determine that the second network entity is unable to discover and/or select the network instance. In such a case, said response to the received request may comprise signalling an indication that the second network entity is unable to discover and/or select the network instance.

The network instance in the second domain may be one of: a service producer; and a service consumer.

The network entity in the first and/or second domain may be a service communication proxy.

The first and second domains may be respective first and second public land mobile networks, or the first and second domains are respective first and second non-public networks, or the first and second domains are respective first and second service communication proxy domains of a third public land mobile network.

Figure 2:
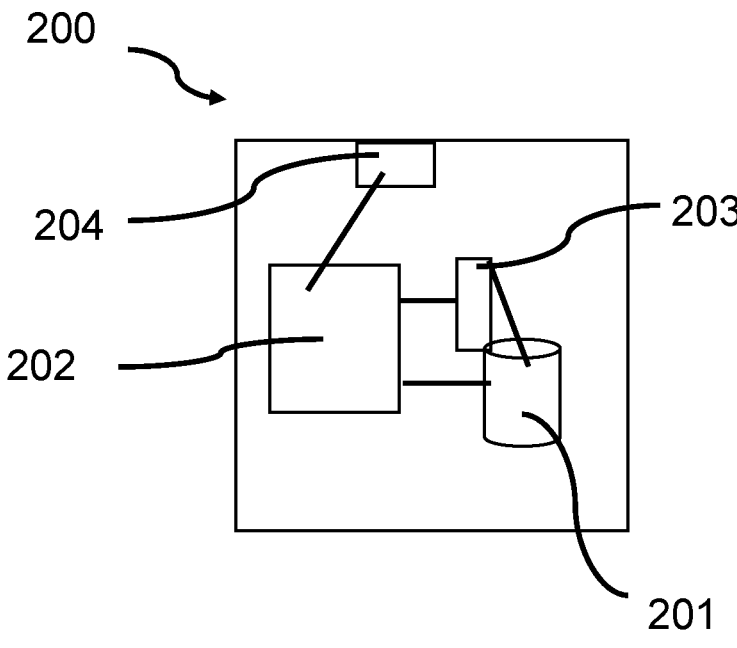
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR etc. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example the control apparatus 200 or processor 201 can be configured to execute an appropriate software code to provide the control functions.

Figure 3:
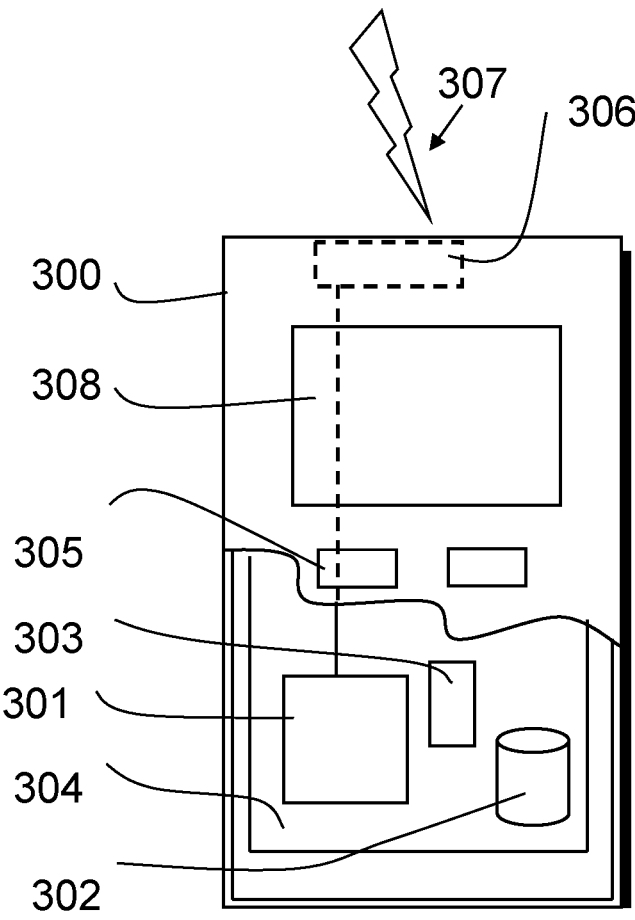
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the wireless device by means of a suitable user interface such as key pad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
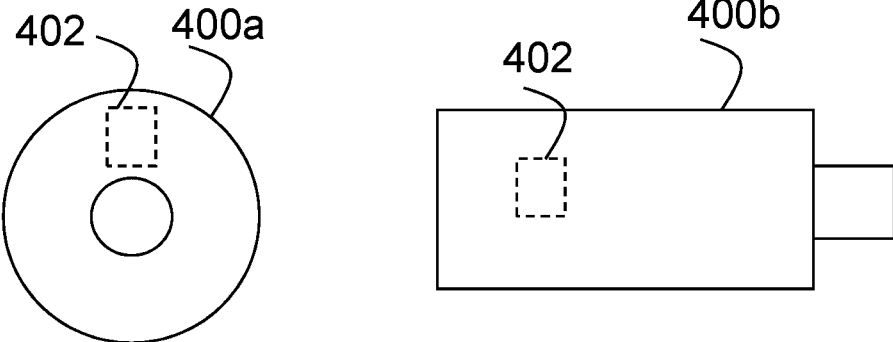
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400*a* (e.g. computer disc (CD) or digital versatile disc (DVD)) and 400*b* (e.g. universal serial bus (USB) memory stick) storing instructions and/or parameters 402 which when executed by a processor allow the processor to perform one or more of the steps of the methods of FIG. 13 and/or FIG. 14 and/or FIG. 15 and/or FIG. 16.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 13 and/or FIG. 14 and/or FIG. 15 and/or FIG. 16, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multicore processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

In the above, different examples are described using, as an example of an access architecture to which the presently described techniques may be applied, a radio access architecture based on long term evolution advanced (LTE Advanced, LTE-A) or new radio (NR, 5G), without restricting the examples to such an architecture, however. The examples may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 5:
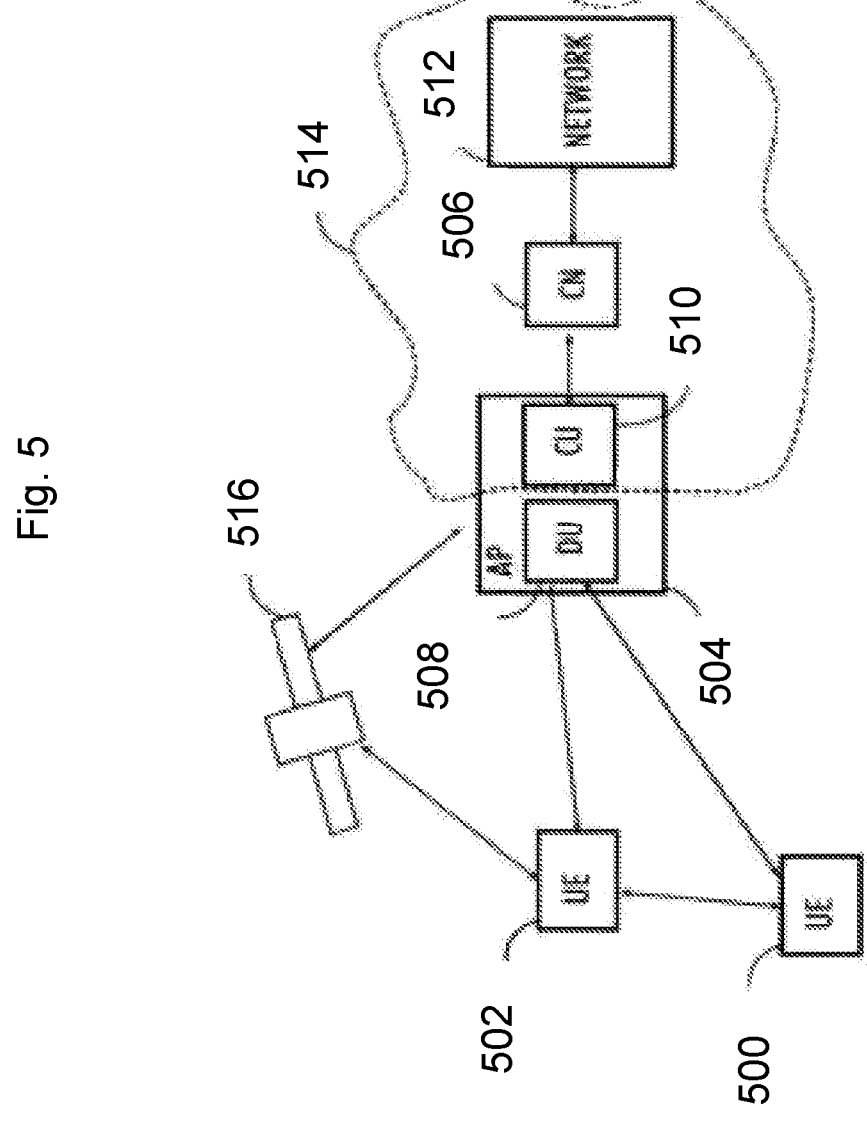
FIG. 5 shows a schematic representation of a network structure.

FIG. 5 depicts examples of simplified system architectures only showing some elements and functional entities, all being logical units, whose implementation may differ from what is shown. The connections shown in FIG. 5 are logical connections; the actual physical connections may be different. It is apparent to a person skilled in the art that the system typically comprises also other functions and structures than those shown in FIG. 5.

The examples are not, however, restricted to the system given as an example but a person skilled in the art may apply the solution to other communication systems provided with necessary properties.

The example of FIG. 5 shows a part of an exemplifying radio access network. For example, the radio access network may support sidelink communications described below in more detail.

FIG. 5 shows devices 500 and 502. The devices 500 and 502 are configured to be in a wireless connection on one or more communication channels with a node 504. The node 504 is further connected to a core network 506. In one example, the node 504 may be an access node such as (e/g)NodeB serving devices in a cell. In one example, the node 504 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 506 (CN or next generation core NGC). Depending on the deployed technology, the (e/g)NodeB is connected to a serving and packet data network gateway (S-GW +P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Examples of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or, in some examples, a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 512, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 5 by "cloud" 514). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 508) and non-real time functions being carried out in a centralized manner (in a centralized unit, CU 510).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 5 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 5). A HNB Gateway (HNB-GW), which is typically installed within an operator's network may aggregate traffic from a large number of HNBs back to a core network.

What is claimed is:

1. An apparatus comprising:
at least one processor; and
at least one memory comprising code of a first network repository function, the code, when executed by the at least one processor, causing the apparatus at least to perform:
when operating in a first domain:
receiving a first indication from a second network repository function operating in a second domain, the first indication indicating whether at least one network entity in the second domain is capable of performing discovery and/or selection of a network function instance in the second domain on behalf of a network entity located in the first domain; and
in response to said receiving, transmitting, to a first network entity located in the first domain, an instruction to delegate discovery and/or selection of said network function instance to a network entity located in the second domain.

2. An apparatus as claimed in claim 1, wherein the code, when executed by the at least one processor, further causes the apparatus to perform:
signaling to the second network repository function a first request requesting the first indication, wherein the first request is comprised within a bootstrapping request.

3. An apparatus as claimed in claim 1, wherein the code, when executed by the at least one processor, further causes the apparatus to perform:
signaling to the second network repository function a first request requesting the first indication, wherein the first request is comprised within a discovery request.

4. An apparatus as claimed in claim 3, wherein the discovery request is at least one of the following: a request to discover a network function instance in the second domain that provides a requested service, or a request to discover a service communication proxy in the second domain that is capable of performing said discovery and/or selection.

5. An apparatus as claimed in claim 1, wherein the code, when executed by the at least one processor, further causes the apparatus to perform:
receiving, from a network entity located in the first domain, a second request to discover the network function instance in the second domain; and
signaling the second network repository function a first request for said first indication in response to receiving said second request.

6. An apparatus as claimed in claim 1, wherein the first indication indicates at least one network entity in the second domain that is capable of performing discovery and/or selection of the network function instance.

7. An apparatus as claimed in claim 6, wherein the first indication indicates at least one type of network function in the second domain that is capable of being discovered and/or selected as the network function instance by a network entity in the second domain.

8. An apparatus as claimed in claim 6, wherein the first indication comprises at least one identifier and/or address of the network entity in the second domain that is capable of performing discovery and/or selection of the network function instance.

9. An apparatus as claimed in claim 6, wherein the first indication does not comprise profiles of any network function instances.

10. An apparatus as claimed in claim 1, wherein the code, when executed by the at least one processor, further causes the apparatus to perform: maintaining a store of said indication.

11. An apparatus as claimed in claim 1, wherein the network instance in the second domain is one of the following: a service producer; or a service consumer.

12. An apparatus as claimed in claim 1, wherein the network entity in the second domain is a service communication proxy.

13. An apparatus as claimed in claim 1, wherein: the first and second domains are respective first and second public land mobile networks, or the first and second domains are respective first and second non-public networks, or the first and second domains are respective first and second service communication proxy domains of a third public land mobile network.

14. A method of a first network repository entity, the method comprising:
when operating in a first domain:
receiving a first indication from a second network repository function operating in a second domain, the first indication indicating whether at least one network entity in the second domain is capable of performing discovery and/or selection of a network function instance in the second domain on behalf of a network entity located in the first domain; and
in response to said receiving, transmitting, to a first network entity located in the first domain, an instruction to delegate discovery and/or selection of said network function instance to a network entity located in the second domain.

15. A method as claimed in claim 14, further comprising:
signaling to the second network repository function a first request requesting the first indication, wherein the first request is comprised within a bootstrapping request.

16. A method as claimed in claim 14, further comprising:
signaling to the second network repository function a first request requesting the first indication, wherein the first request is comprised within a discovery request.

17. A method as claimed in claim 14, further comprising:
receiving, from a network entity located in the first domain, a second request to discover the network function instance in the second domain; and
signaling the second network repository function a first request for said first indication in response to receiving said second request.

18. A method as claimed in claim 17, wherein the discovery request is at least one of the following: a request to discover a network function instance in the second domain that provides a requested service, or a request to discover a service communication proxy in the second domain that is capable of performing said discovery and/or selection.

19. A method as claimed in claim 14, wherein the first indication indicates at least one network entity in the second domain that is capable of performing discovery and/or selection of the network function instance.

20. A non-transitory computer readable medium comprising code of a first network repository function, the code, when executed by an apparatus, causing the apparatus to perform:

when operating in a first domain:

receiving a first indication from a second network repository function operating in a second domain, the first indication indicating whether at least one network entity in the second domain is capable of performing discovery and/or selection of a network function instance in the second domain on behalf of a network entity located in the first domain; and in response to said receiving, transmitting, to a first network entity located in the first domain, an instruction to delegate discovery and/or selection of said network function instance to a network entity located in the second domain.

\* \* \* \* \*